(12) United States Patent
Fukuguchi et al.

(10) Patent No.: US 8,694,602 B2
(45) Date of Patent: Apr. 8, 2014

(54) STORAGE APPARATUS AND ITS DATA PROCESSING METHOD

(75) Inventors: Hitoshi Fukuguchi, Odawara (JP); Masahide Kawarasaki, Odawara (JP); Akira Nishimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 266 days.

(21) Appl. No.: 13/124,569

(22) PCT Filed: Apr. 6, 2011

(86) PCT No.: PCT/JP2011/002039
§ 371 (c)(1),
(2), (4) Date: Apr. 15, 2011

(87) PCT Pub. No.: WO2012/137252
PCT Pub. Date: Oct. 11, 2012

(65) Prior Publication Data
US 2012/0259944 A1     Oct. 11, 2012

(51) Int. Cl.
*G06F 15/16* (2006.01)
*G06F 12/00* (2006.01)

(52) U.S. Cl.
USPC ........... 709/217; 709/218; 709/219; 709/203; 370/412; 370/418; 711/171

(58) Field of Classification Search
USPC .......... 709/201–203, 217–219; 370/412–418; 711/171
See application file for complete search history.

(56) References Cited

U.S. PATENT DOCUMENTS

| | | | |
|---|---|---|---|
| 7,636,801 B1 | 12/2009 | Kekre et al. | |
| 2002/0099785 A1* | 7/2002 | Teeple | 709/214 |
| 2006/0059408 A1 | 3/2006 | Chikusa et al. | |

(Continued)

FOREIGN PATENT DOCUMENTS

| | | |
|---|---|---|
| EP | 1 357 465 A2 | 10/2003 |
| JP | 2006-079380 | 3/2006 |
| JP | 2006-195851 | 7/2006 |
| JP | 2009-129201 | 6/2009 |

OTHER PUBLICATIONS

PCT International Search Report and Written Opinion on application PCT/JP2011/002039 dated Nov. 30, 2011; 12 pages.

*Primary Examiner* — Andrew Chriss
*Assistant Examiner* — Romani Ohri
(74) *Attorney, Agent, or Firm* — Foley & Lardner LLP

(57) ABSTRACT

Data conversion processing for converting access target data into data of a different block size is executed without degradation of data input/output processing performance.

A first controller manages its own load by associating it with LUs, which are access targets of an access requester; and if the first controller receives an access request from the access requester, it judges whether its load exceeds a threshold or not; and if its load exceeds the threshold, the first controller executes first data conversion processing for converting data relating to an access target LU(s) of the access requester from a first block size into a second block size or second data conversion processing for converting the data from the second block size into the first block size; and if its load is equal to or less than the threshold, the first controller gives a command to a second controller to execute the first data conversion processing or the second data conversion processing and the second controller executes the first data conversion processing or the second data conversion processing based on the command from the first controller.

14 Claims, 26 Drawing Sheets

(56) References Cited

U.S. PATENT DOCUMENTS

| | | |
|---|---|---|
| 2006/0253549 A1* | 11/2006 | Arakawa et al. ............ 709/217 |
| 2009/0138672 A1* | 5/2009 | Katsuragi et al. ............ 711/171 |
| 2009/0187717 A1* | 7/2009 | Nasu ............................ 711/141 |
| 2009/0235269 A1* | 9/2009 | Nakajima et al. ............ 718/104 |
| 2009/0292789 A1* | 11/2009 | Nagai et al. .................. 709/213 |
| 2010/0250845 A1 | 9/2010 | Murase |
| 2010/0318735 A1 | 12/2010 | Yagisawa et al. |

* cited by examiner

FIG.6

| LU NUMBER | RG NUMBER | HDD NUMBER |
|---|---|---|
| 0x0000 | 0x000 | 0x000, 0x001, 0x002, 0x003 |
| 0x0001 | 0x000 | 0x000, 0x001, 0x002, 0x003 |
| 0x0002 | 0x001 | 0x004, 0x005, 0x006, 0x007 |
| 0x0003 | 0x002 | 0x008, 0x009, 0x00A, 0x00B, 0x00C |
| 0x0004 | 0x002 | 0x008, 0x009, 0x00A, 0x00B, 0x00C |
| 0x0005 | 0x001, 0x002 | 0x004, 0x005, 0x006, 0x007, 0x008, 0x009, 0x00A, 0x00B, 0x00C |
| ... | ... | ... |

FIG.7

| POOL NUMBER | RG NUMBER | HDD NUMBER |
|---|---|---|
| 0x00 | 0x000 | 0x000, 0x001, 0x002, 0x003 |
| 0x01 | 0x001 | 0x004, 0x005, 0x006, 0x007 |
| 0x02 | 0x002 | 0x008, 0x009, 0x00A, 0x00B, 0x00C |
| 0x03 | 0x003 | 0x00D, 0x00E, 0x00F, 0x010 |
| 0x04 | 0x004 | 0x011, 0x012, 0x013, 0x014 |
| 0x05 | 0x005, 0x006 | 0x015, 0x016, 0x017, 0x018, 0x019, 0x01A, 0x01B, 0x01C |
| ... | ... | ... |

FIG.8

| LU NUMBER | MEASURED IOPS VALUE |
|---|---|
| 0x0000 | 1000 |
| 0x0001 | 1100 |
| 0x0002 | 1500 |
| 0x0003 | 1300 |
| 0x0004 | 1200 |
| 0x0005 | 1800 |
| ⋮ | ⋮ |

| POOL NUMBER | LOAD FACTOR |
|---|---|
| 0x00 | 70 |
| 0x01 | 42 |
| 0x02 | 80 |
| 0x03 | 33 |
| 0x04 | 50 |
| 0x05 | 68 |
| ⋮ | ⋮ |

FIG.20

| POOL NUMBER | CONVERSION METHOD |
|---|---|
| 0x00 | MICROPROGRAM |
| 0x01 | HDD |
| 0x02 | MICROPROGRAM |
| 0x03 | HDD |
| 0x04 | HDD |
| 0x05 | MICROPROGRAM |
| ⋮ | ⋮ |

STORAGE APPARATUS AND ITS DATA PROCESSING METHOD

TECHNICAL FIELD

The present invention relates to a storage apparatus and data processing method enabling each controller to convert a block size of data to be processed even when a block size of data handled by a first controller for sending/receiving data to/from an access requester is different from a block size of data handled by a second controller for controlling data input/output processing on storage devices.

BACKGROUND ART

Conventionally, when managing storage devices, for example, HDDs (Hard Disk Drives), in a storage apparatus, data is stored in logical blocks in the HDDs by recognizing a 512-B (bytes) block size as a logical block (logical block composed of 512-B long data). Under this circumstance, an 8-B guarantee code is sometimes added to data in order to deal with the occurrence of failures in the HDDs.

An LRC (Longitudinal Redundancy Check) obtained by a host computer performing an exclusive OR operation on a logical address of a logical block designated as an access destination and data of the logical block is used as the above-mentioned guarantee code.

The logical address is used to detect an error of the address of a storage area to which logical block data is written. The LRC is used as an error detection code to detect an error of the logical block data.

If the guarantee code is added to the logical block, a data management unit handled in the storage apparatus may be sometimes different from a data management unit in the HDD. For example, the HDD where the block length (sector length) is fixed to the logical block size stores data in logical blocks. Accordingly, if the block size is increased by adding the guarantee code to the logical block, the logical block data with the guarantee code may not be stored, without any change, according to the HDD format.

So, block size conversion processing executed in the storage apparatus is suggested in order to solve the above-described problem.

For example, when 520-B data which is obtained by adding the 8-B guarantee code to the 512-B data is written to a storage device in which sectors are managed every 512 B, a suggested method is to read data to be stored in a plurality of sectors to a cache memory, write the 520-B data to the relevant part, thereby update part of the data, and then write the updated data to the sectors (see Patent Literature 1).

Another suggested method is to: form data so that the guarantee code is included as part of 512-B data; and rewrite the guarantee code and add the guarantee code to the 512-B data when writing data; and read the guarantee code and check correctness of the data when reading the data (see Patent Literature 2).

Another suggested method, when writing 520-B data, which is obtained by adding an 8-B guarantee code to 512-B data, to HDDs in which sectors are managed using the 512 B sector size, is to write 64 pieces of 520-B data to 65 sectors and the guarantee codes are collected and written to the 65$^{th}$ sector (see Patent Literature 3).

CITATION LIST

Patent Literature

PTL 1: Japanese Patent Application Laid-Open (Kokai) Publication No. 2009-129201

PTL 2: Japanese Patent Application Laid-Open (Kokai) Publication No. 2006-079380

PTL 3: Japanese Patent Application Laid-Open (Kokai) Publication No. 2006-195851

SUMMARY OF INVENTION

Technical Problem

When the 8-B guarantee code is added to the 512-B data by using the processing methods described in the aforementioned Patent Literature, it is also possible to convert the 512-B block size data into the 520-B block size data.

However, when 4-kB data is used as a block size of data to be stored in HDDs, the processing methods described in the aforementioned Patent Literature cannot be used without any change.

In this case, for example, if a storage apparatus receives data of the 512-B block size from a host computer, a microprocessor for the storage apparatus needs to either generate 520-B data by adding the 8-B guarantee code to the 512-B data and convert the generated 520-B block size data into 4-kB block size data or convert the data of a 520-B data block into data of a 4-kB block size by using an emulator mounted in the HDD.

However, if the block size conversion processing is executed by only the micro-processor for the storage apparatus or the emulator mounted in the HDD, the block size conversion processing requires time depending on load on the microprocessor or load on the emulator, thereby degrading data input/output processing performance.

The present invention was devised in light of the problems of the conventional technology and it is an object of the invention to provide a storage apparatus and data processing method capable of executing data conversion processing for converting access target data requested by an access request from an access requester into data of a different block size without degradation of the data input/output processing performance.

Solution to Problem

In order to achieve the above-described object, a storage apparatus including a first controller for sending or receiving information to or from one or more access requesters via a network and controlling data input/output processing on a buffer, and a second controller for sending or receiving data to or from the first controller and controlling data input/output processing on storage devices is provided according to the present invention, wherein the first controller manages its load by associating it with one or more logical units which are access targets of the access requester in a process of executing the data input/output processing on the buffer; and if the first controller receives an access request from the access requester and on condition that its load is a low load, the first controller executes first data conversion processing for converting data relating to the logical units, which are the access targets of the access requester, from a first block size into a second block size or second data conversion processing for converting the data from the second block size into the first block size; and on condition that its load is a high load, the first controller gives a command to the second controller to execute the first data conversion processing or the second data conversion processing and the second controller executes the first data conversion processing or the second data conversion processing based on the command from the first controller.

Advantageous Effects of Invention

According to the present invention, the data conversion processing for converting access target data into data of a different block size can be executed without degradation of the data input/output processing performance.

BRIEF DESCRIPTION OF DRAWINGS

FIG. 6 is a configuration diagram of an LU/RG and HDD association table.

FIG. 7 is a configuration diagram of a pool and HDD association table.

FIG. 8 is a configuration diagram of a measured IOPS value storage table for LUs.

FIG. 20 is a configuration diagram of a conversion method storage table for pools.

DESCRIPTION OF EMBODIMENTS (Concept of the Invention)

Figure 1:
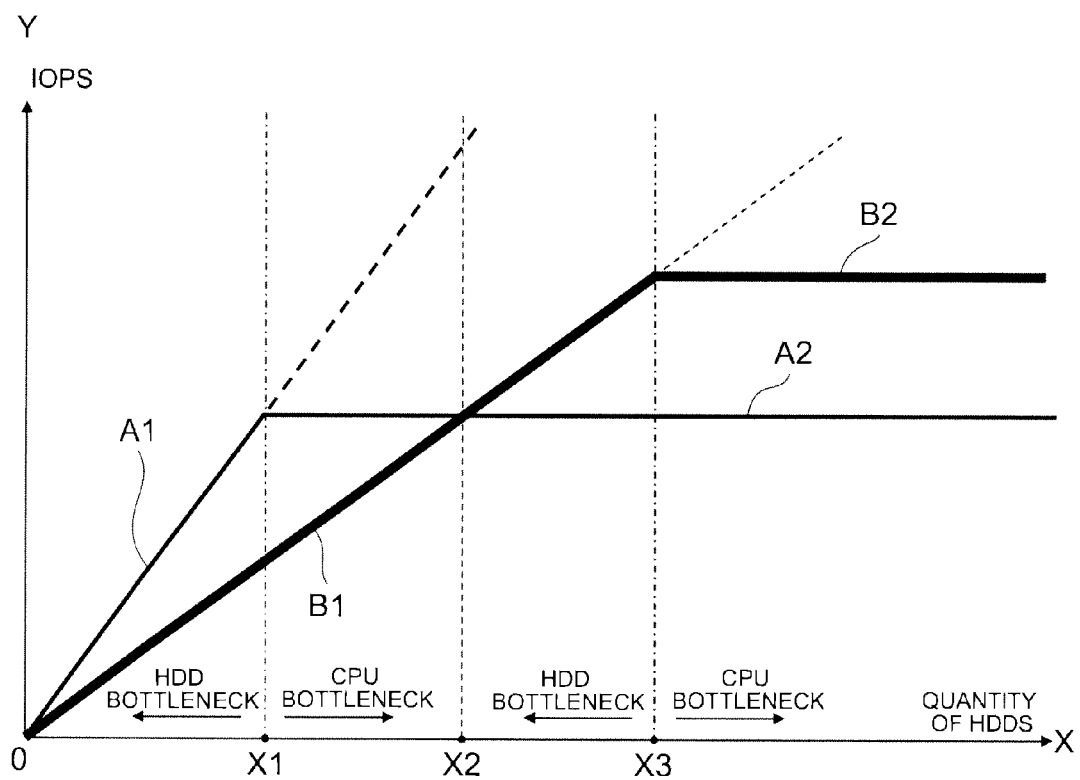
FIG. 1 is a characteristic diagram explaining the relationship between IOPS and the quantity of HDDs.

The concept of the present invention will be hereinafter explained with reference to a characteristic diagram of FIG. 1. Referring to FIG. 1, the X axis represents the quantity of HDDs and the Y axis represents access frequency per a certain period of time (hereinafter sometimes referred to as IOPS).

If a storage apparatus includes a first controller for sending/receiving information to/from an access requester(s) via a network and controlling data input/output processing on a buffer, and a second controller for sending/receiving data to/from the first controller and controlling data input/output processing on a plurality of storage devices, for example, HDDs, while the HDD quantity is less than X1, the IOPS of the first controller increases along a straight line A1 and the IOPS of the second controller increases along a straight line B1.

In other words, if the HDD quantity is less than X1, the first controller can execute the data input/output processing more frequently than the second controller can.

However, if the HDD quantity exceeds X1, the first controller can no longer increase work-load for transferring data to the HDDs along with an increase of the HDD quantity (the CPU work-load becomes a bottleneck). So, if the HDD quantity exceeds X1, the IOPS of the first controller is fixed to an upper limit indicated by a straight line A2 even though the HDD quantity increases.

On the other hand, the IOPS of the second controller increases along the straight line B1 even though the HDD quantity gradually increases to X1, X2, and X3. Under this circumstance, if the HDD quantity becomes X2, the IOPS value of the second controller becomes equal to the IOPS value of the first controller; however, if the HDD quantity exceeds X2, the IOPS value of the second controller becomes larger than the IOPS value of the first controller.

In other words, if the HDD quantity exceeds X2, the second controller can execute the data input/output processing along with an increase of the HDD quantity and can execute the data input/output processing more frequently than the first controller can.

However, if the HDD quantity exceeds X3, the work-load of the first controller to transfer data to the second controller reaches an upper limit (the CPU work-load becomes a bottleneck) and the second controller can no longer execute the data input/output processing along with an increase of the HDD quantity. Therefore, if the HDD quantity exceeds X3, the IOPS of the second controller is fixed to an upper limit indicated by a straight line B2 even though the HDD quantity increases.

Referring to FIG. 1, when the HDD quantity is equal to or less than X2, the IOPS value of the first controller is larger than that of the second controller. Accordingly, if the HDD quantity is equal to or less than X2, the first controller can execute the data input/output processing more frequently than the second controller can. In other words, in the process of executing the data input/output processing, the first controller can execute block size conversion processing and data transfer processing while its load is lower than a load on the second controller.

On the other hand, if the HDD quantity exceeds X2, the IOPS value of the second controller becomes larger than that of the first controller. Accordingly, if the HDD quantity exceeds X2, the first controller can no longer execute the data input/output processing more frequently than the second controller can and the load on the first controller becomes higher than the load on the second controller. Specifically speaking, in the processing of executing the data input/output processing, the second controller can execute the block size conversion processing and the data transfer processing while its load is lower than the load on the first controller.

So, with a storage apparatus according to the present invention including a first controller for sending or receiving information to or from an access requester(s) and controlling data input/output processing on a buffer, and a second controller for sending or receiving data to or from the first controller and controlling data input/output processing on storage devices, the first controller manages its load by associating it with one or more logical units which are access targets of the access requester in the process of executing the data input/output processing on the buffer; and if the first controller receives an access request from the access requester, it judges whether its load exceeds a threshold or not; and if it is determined that its load exceeds the threshold (in a case where its load is low), the first controller executes first data conversion processing for converting access target data requested by the access request from a first block size into a second block size or second data conversion processing for converting the data from the second block size into the first block size; and if it is determined that its load does not exceed the threshold (in a case where its load is high), the first controller gives a command to the second controller to execute the first data conversion processing or the second data conversion processing and the second controller executes the first data conversion processing or the second data conversion processing based on the command from the first controller.

In other words, in the process of executing the data input/output processing relating to the logical units which are the access targets of the access requester, the first controller manages its load by associating it with the logical units which are the access targets of the access requester; and if its load exceeds the threshold and is lower than the load on the second controller, the first controller executes the first data conversion processing or the second data conversion processing; and if its load is equal to or less than the threshold and is higher than the load on the second controller, the first controller has the second controller execute the first data conversion processing or the second data conversion processing.

Embodiment

An embodiment of the present invention will be hereinafter explained with reference to the attached drawings.

Overall Configuration

Figure 2:
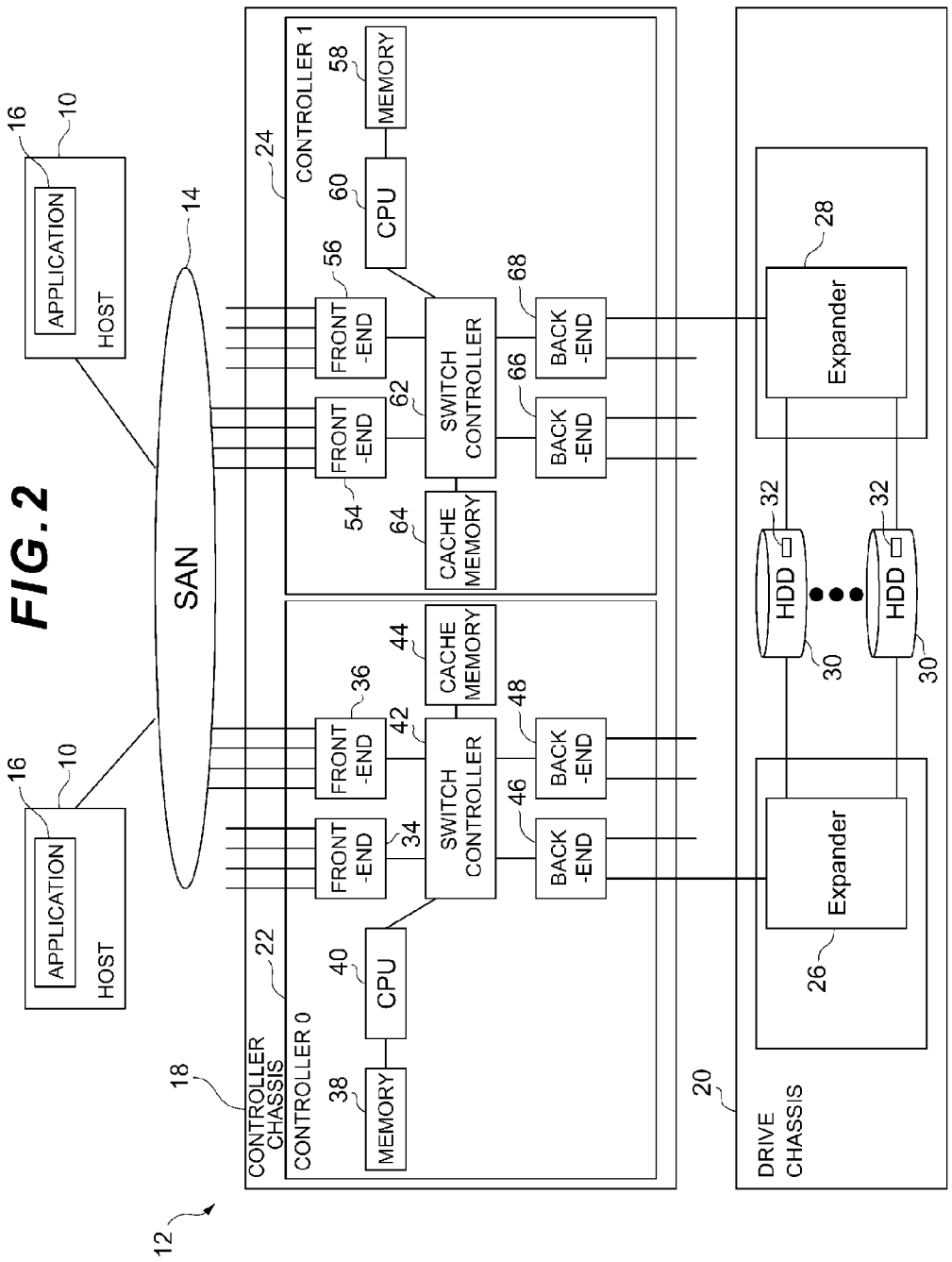
FIG. 2 is a block configuration diagram of a storage system to which the present invention is applied.

FIG. 2 is a block configuration diagram of a storage apparatus to which the present invention is applied. Referring to FIG. 2, a storage system includes a plurality of host computers (hereinafter sometimes referred to as the hosts) 10 and a storage apparatus 12; and each host 10 and the storage apparatus 12 are connected via a network 14. Incidentally, for example, a SAN (Storage Area Network) can be used as the network 14.

Each host 10 is configured as a computer device which is an access requester equipped with, for example, a microprocessor, a memory, an input/output interface, and a display device (any of which is shown in the drawing). The microprocessor issues an access request including a read access request or a write access request to the storage apparatus 12 in accordance with an application 16 stored in the memory and sends/receives information to/from the storage apparatus 12 via the network 14.

The storage apparatus 12 includes a controller chassis 18 and a drive chassis 20; and the controller chassis 18 contains a controller #0 22 and a controller #1 24; and the drive chassis 20 contains a plurality of expanders 26, 28 as well as a plurality of storage devices, for example, HDDs 30. Each HDD 30 contains an emulator 32.

If HDDs are used as the storage devices, for example, FC (Fibre Channel) disks, SCSI (Small Computer System Interface) disks, SATA (Serial ATA) disks, ATA (AT Attachment) disks, and SAS (Serial Attached SCSI) disks can be used.

Besides the HDDs, for example, semiconductor memory devices, optical disk devices, optical magnetic disk devices, magnetic tape devices, and flexible disk devices can be used as the storage devices.

Also, each HDD 30 can constitute a RAID (Redundant Array of Inexpensive Disks) group (hereinafter sometimes referred to as RG) such as RAID4, RAID5, and RAID6 and each HDD 30 can also constitute a plurality of RGs (RAID groups).

Under this circumstance, a plurality of logical units (hereinafter sometimes referred to as LUs (Logical Units)) and a plurality of logical volumes can be formed on physical storage areas of each HDD 30.

The LUs are logical units provided as access targets of each host 10 to each host 10 and are divided into, for example, normal LUs and virtual LUs.

The normal LUs are composed of logical storage areas formed in each HDD 30. The virtual LUs are provided by a thin provisioning function and composed of storage area units called pages.

An LU number (Logical Unit Number) and a logical block address LBA (Logical Block Address) are assigned as identifiers to a normal LU and a virtual LU. Under this circumstance, each host 10 can access data stored in a storage area corresponding to a normal LU or a virtual LU by sending the logical address composed of the LU number and the logical block address LBA to the storage apparatus 12.

The controller #0 22 includes front-ends 34, 36, a memory 38, a CPU 40, a switch controller 42, a cache memory (buffer) 44, and back-ends 46, 48.

The controller #1 24 includes front-ends 54, 56, a memory 58, a CPU 60, a switch controller 62, a cache memory (buffer) 64, and back-ends 66, 68.

Incidentally, since the controller #0 22 and the controller #1 24 have the same configuration, only the configuration of the controller #0 22 will be explained below.

In the controller #0 22, the front-end 34, 36 is a unit serving as a host interface or a channel adapter for sending/receiving information to/from each host 10 via the network 14; and the front-end 34, 36, for example, interprets commands or access requests from each host 10 and executes control to transfer data from each host 10 to the CPU 40 and the cache memory 44 via the switch controller 42.

The CPU 40 serves as a microprocessor for controlling the entire controller #0 22, activates a microprogram stored in the memory 38, and executes, for example, data input/output processing and data conversion processing for converting a block size based on information of various tables stored the memory 38.

For example, if the CPU 40 receives a write access request from each host 10, it activates the microprogram on a certain condition (for example, if its load is low) and executes first data conversion processing for converting target data of the write access request (data obtained by adding an 8-B guarantee code to 512-B data) from a first block size (520 B) into a second block size (4 kB); and if the CPU 40 receives a read access request from each host 10, it activates the microprogram on a certain condition and executes second data conversion processing for converting target data of the read access request from the second block size (4 kB) into the first block size (520 B).

Under this circumstance, the controller #0 22 serves as the first controller as the CPU 40 activates the microprogram and executes the first data conversion processing or the second data conversion processing.

The switch controller 42 is a unit serving as a line concentrator or a hub and has a function connecting each front-end 34, 36, the CPU 40, the cache memory 44, and each back-end 46, 48 via paths and sorting data to each of the units connected via the paths.

The cache memory 44 constitutes a storage area for temporarily storing data processed by the CPU 40 and data transferred from the emulators 32 and serves as a buffer for temporarily storing data.

The back-end 46, 48 is a unit serving as a disk adapter or a disk interface, sends/receives data to/from the expanders 26 in the drive chassis 20, and controls data transfer to the CPU 40 and the cache memory 40 via the switch controller 42.

Each expander 26 in the drive chassis 20 is a unit serving as an interface for sending/receiving data to/from each back-end 46, 48, controlling transfer of data from each back-end 46, 48 to each HDD 30, and controlling transfer of data from each HDD 30 to each back-end 46, 48.

Each emulator 32 is mounted in each HDD 30 and serves as a microprocessor for controlling the data input/output processing on each HDD 30. Under this circumstance in the process of controlling the data input/output processing on each HDD 30, each emulator 32 serves as the second controller for executing the first data conversion processing for converting target data of a write access request from the first block size (520 B) into the second block size (4 kB) and executing the second data conversion processing for converting target data of a read access request from the second block size (4 kB) into the first block size (520 B) based on a command from the CPU 40.

Incidentally, instead of mounting the emulator 32 in each HDD 30, a microprocessor for controlling each entire HDD 30 (the plurality of storage devices as a whole) can be placed in the drive chassis 20 and this microprocessor can be made to serve as the second controller.

Furthermore, when the controller #0 22 recognizes each host 10 as an access requester and manages a plurality of LUs, which are access targets of each access requester, by dividing them into a plurality of normal LUs and a plurality of virtual LUs, it uses an LU type table stored in the memory 38 to distinguish between the normal LUs and the virtual LUs.

Figure 3:
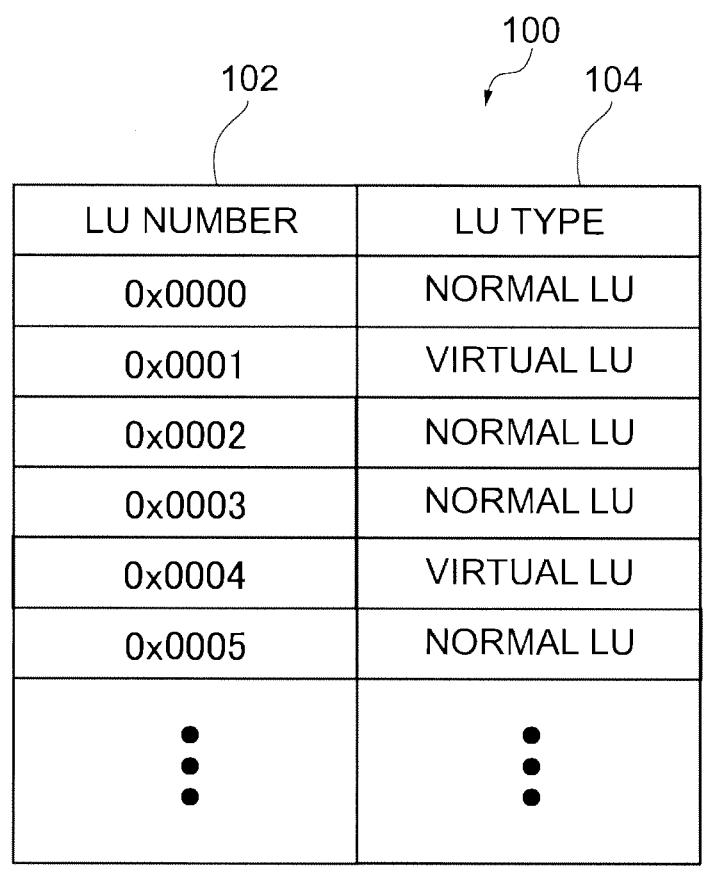
FIG. 3 is a configuration diagram of an LU type table.

Next, FIG. 3 shows a configuration diagram of the LU type table.

Referring to FIG. 3, an LU type table 100 is a table stored in the memory 38 and is constituted from an LU number (LUN) 102 and an LU type 104. The LU number 102 is an identification number to uniquely identify a normal LU or a virtual LU and each entry of the LU number 102 stores information indicating the identification number corresponding to the normal LU or the virtual LU.

For example, each entry of the LU number 102 stores the number such as 0x0000, 0x0001, 0x0002, 0x0003, 0x0004, 0x0005, and so on.

The LU type 104 is information for identifying whether the relevant LU (logical unit) is a normal LU or a virtual LU. Each entry of the LU type 104 stores: normal LU information corresponding to the LU number 102 if the relevant LU is a normal LU: or virtual LU information if the relevant LU is a virtual LU.

Furthermore, the controller 22 manages the virtual LUs by using part of the memory 38 as a management area.

Figure 4:
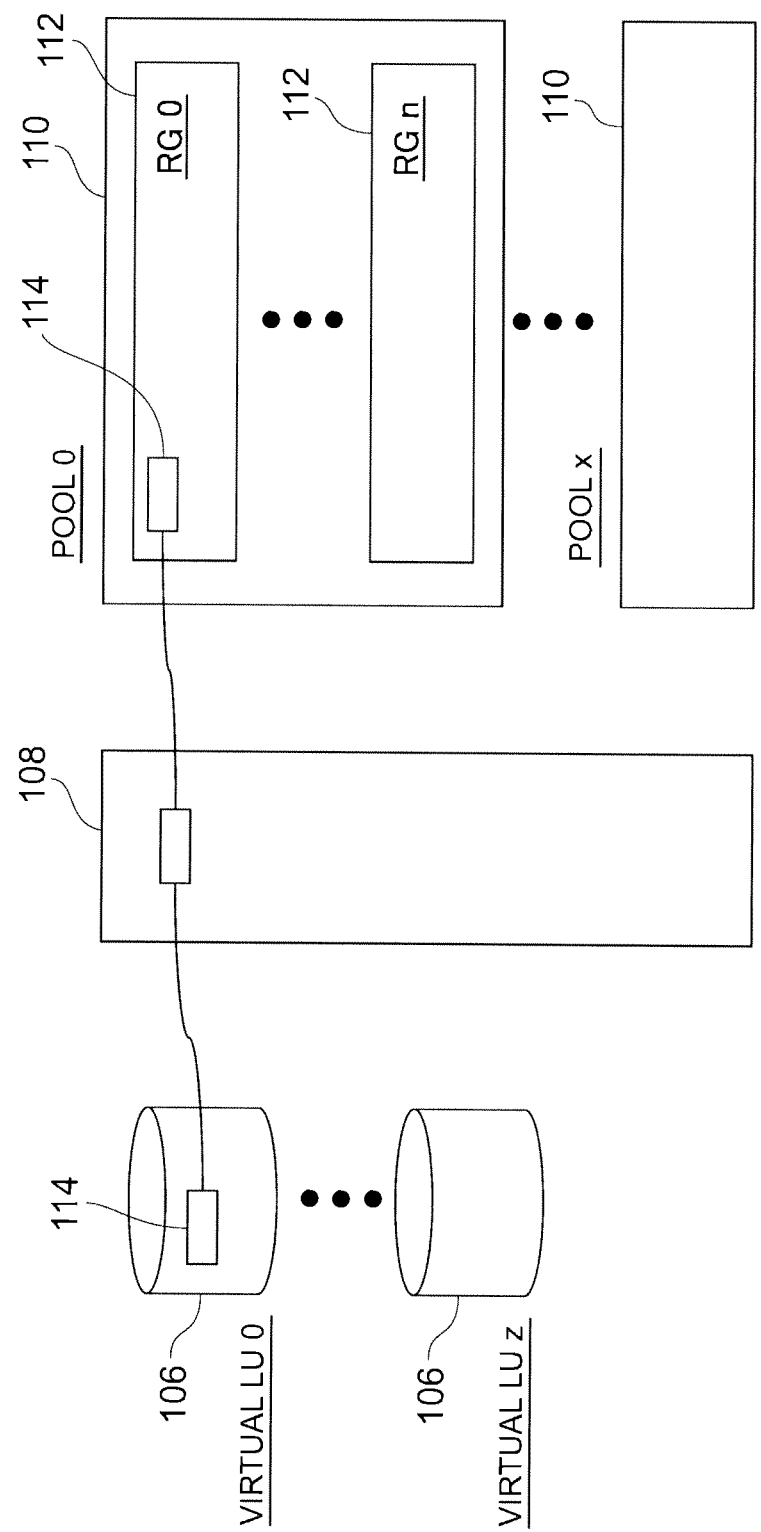
FIG. 4 is a conceptual diagram explaining the relationship between virtual LUs and pools.

Next, FIG. 4 shows a schematic diagram when managing the virtual LUs by using part of the memory 38 as the management area.

Referring to FIG. 4, virtual LUs #0 to #z 106 are configured as targets accessed from each host 10 and configured as logical units having capacity recognized by each host 10. A virtual address of each virtual LU 106 is registered in the management area 108 of the memory 38 and the virtual addresses are managed by being associated with pool addresses of pools #0 to #x 110. Each pool 110 is composed of a plurality of blocks 112. RGs #0 to #n (RAID groups) composed of the HDDs 30 are allocated to each block 112.

At the initial state where the virtual LUs #0 to #z 106 are not accessed by each host 10, no real area 114 is allocated to the relevant virtual storage areas. On the other hand, if any of the hosts 10 inputs, for example, a write access request as an access request to the virtual LUs #0 to #z 106, the real area 114 in the block 112 registered in the pool 110 is allocated to the virtual storage area of each virtual LU 106 by means of the thin provisioning function of the CPU 40.

Under this circumstance, if any of the hosts 10 inputs a write access request to, for example, the virtual LU #0 106, write data which is a write access target is stored in a page (a minimum unit storage area formed in the storage areas of the HDD 30) which is the real area 114, from among the blocks 112 belonging to the pool #0 110 associated with the virtual address of the virtual LU #0 106.

Incidentally, the management area 108 stores, as pool management information, a pool ID (identifier) for identifying each pool 110, unused capacity of each pool 110, information about a threshold, and so on.

Next, the configurations of various tables stored in the memory 38 will be explained.

Figure 5:
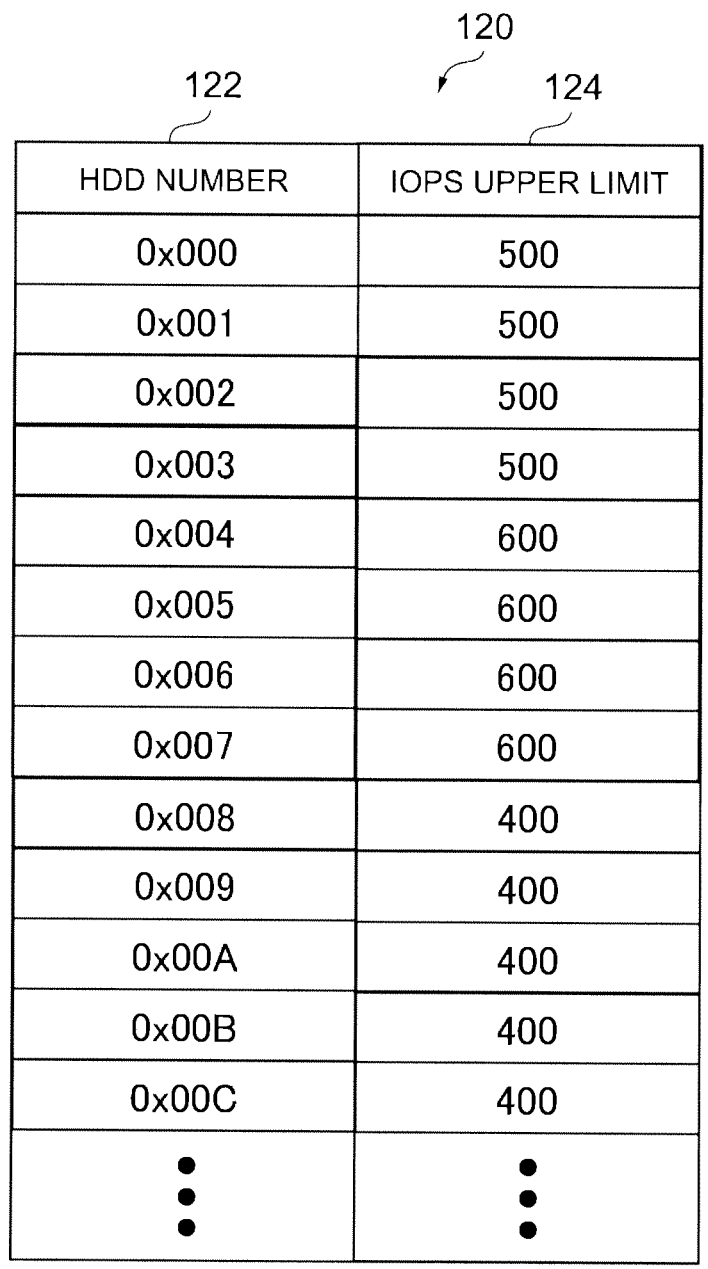
FIG. 5 is a configuration diagram of an HDD IOPS upper limit table.

FIG. 5 shows a configuration diagram of an HDD IOPS upper limit table.

Referring to FIG. 5, an HDD IOPS upper limit table 120 is a table stored in the memory 38 and is constituted from an HDD number 122 and an IOPS upper limit 124.

The HDD number 122 is the number for uniquely identifying each HDD 30. Each entry of the HDD number 122 stores, for example, 0x000, 0x001, 0x002, and so on corresponding to the number of each HDD 30.

The IOPS upper limit 124 is information indicating an upper limit of a readable/writable value per second from/to each HDD 30 (the access frequency IOPS per second to each HDD 30). Each entry of the IOPS upper limit 124 stores a numerical value indicative of the IOPS upper limit corresponding to the HDD number 122. For example, the IOPS upper limit 124 such as 500, 500, 500, and so on is stored corresponding to the HDD number 122 such as 0x000, 0x001, 0x002, and so on.

Next, FIG. 6 shows a configuration diagram of an LU/RG and HDD association table.

Referring to FIG. 6, an LU/RG and HDD association table 130 is a table stored in the memory 38 and is constituted from an LU number 132, an RG number 134, and an HDD number 136.

The LU number 132 is the number for uniquely identifying a normal LU or a virtual LU. Each entry of the LU number 132 stores information about the number for identifying a normal LU or a virtual LU. For example, each entry of the LU number 132 stores the number such as 0x0000, 0x0001, 0x0002, 0x0003, 0x0004, 0x0005, and so on.

The RG number 134 is the number for identifying an RG (RAID group) composed of each HDD 30. Each entry of the RG number 134 stores information about the number of an RG (RAID group) to which the relevant normal LU or virtual LU belongs. For example, information indicating 0x000 is stored as the RG number 134 corresponding to the LU number 132 0x0000. Under this circumstance, if one LU belongs to a plurality of RGs (RAID groups), the RG number 134 stores information about the numbers of the plurality of RGs (RAID groups). For example, if a normal LU whose LU number 132 is 0x0005 belongs to two RGs (RAID groups), 0x001 and 0x002 are stored as information about the numbers of the plurality of RGs (RAID groups) in the entry of the RG number 134 corresponding to the LU number 132 0x0005.

The HDD number 136 is information about the numbers of the HDDs 30 belonging to each RG (RAID group). Each entry of the HDD number 136 stores information about the numbers of the HDDs 30 belonging to each RG (RAID group). For example, if the LU whose RG number 134 is 0x000 is composed of four HDDs 30, information indicating 0x000, 0x001, 0x0002, and 0x0003 are stored as the numbers of the four HDDs 30 in the entry of the HDD number 136 corresponding to the RG number 134 0x000.

Next, FIG. 7 shows a configuration diagram of a pool and HDD association table.

Referring to FIG. 7, a pool and HDD association table 140 is a table stored in the memory 38 and is constituted from a pool number 142, an RG number 144, and an HDD number 146.

The pool number 142 is information about the number for uniquely identifying each pool 110. Each entry of the pool number 142 stores, for example, 0x00, 0x01, 0x02, and so on as the number for identifying each pool 110.

The RG number 144 is information for identifying the number of an RG(s) (RAID group(s)) allocated to each pool 110. Each entry of the RG number 144 stores information about the number of an RG(s) (RAID group(s)) allocated to each pool 110. For example, the number such as 0x000, 0x001, 0x002, and so on is stored as the RG number 144 in each entry of the RG number 144 corresponding to the pool number 142 0x00, 0x01, 0x02, and so on.

Under this circumstance, if a plurality of RGs (RAID groups) are allocated to one pool 110, a plurality of RG numbers 144 are assigned to one pool number 142. For example, 0x005 and 0x006 are stored as the RG number 144 in the entry of the RG number 144 corresponding to the pool number 142 0x05.

The HDD number 146 is information about the numbers of the HDDs 30 belonging to each RG (RAID group). Each entry of the HDD number 146 stores information about the numbers of the HDDs 30 belonging to each RG (RAID group). For example, if the RG (RG number 144: 0x000) allocated to the pool number 142 0x00 is composed of four HDDs 30, information indicating 0x000, 0x001, 0x0002, and 0x0003 are stored as the numbers of the four HDDs 30 in the entry of the HDD number 146 corresponding to the RG number 144 0x000.

Next, FIG. 8 shows a configuration diagram of a measured IOPS value storage table for LUs.

Referring to FIG. 8, a measured IOPS value storage table 150 for LUs is a table stored in the memory 38 and is constituted from an LU number 152 and a measured IOPS value 154.

The LU number 152 is information about the number for identifying a normal LU or a virtual LU. Each entry of the LU number 152 stores 0x0000, 0x0001, 0x0002, 0x0003, 0x0004, 0x0005, and so on as the number for identifying a normal LU or a virtual LU.

The measured IOPS value 154 is a measured value of a readable/writable value per second to a normal LU or a virtual LU (access frequency IOPS per second to a normal LU or a virtual LU).

For example, an average value of measured values obtained for a certain period of time by periodically (for example, at one-minute intervals) measuring the number of times the relevant normal LU or virtual LU is read-accessed or write-accessed can be used as the measured IOPS value 154.

Each entry of this measured IOPS value 154 stores a measured IOPS value of a normal LU or a virtual LU. For example, 10000 is stored as the measured IOPS value 154 corresponding to the LU number 0x0000.

Figure 9:
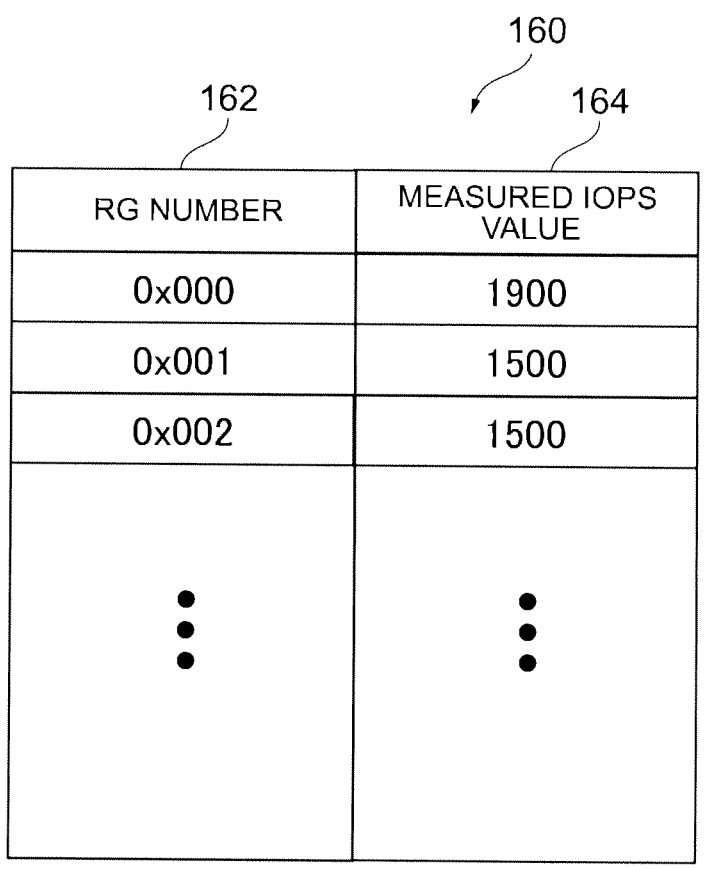
FIG. 9 is a configuration diagram of a measured IOPS value storage table for RGs.

Next, FIG. 9 shows a configuration diagram of a measured IOPS value storage table for RGs.

Referring to FIG. 9, the measured IOPS value storage table 160 for RGs is a table stored in the memory 38 and is constituted from an RG number 162 and a measured IOPS value 164.

The RG number 162 is information about the number for identifying an RG (RAID group) to which a normal LU belongs. Each entry of the RG number 162 stores for example, 0x000, 0x001, 0x002, and so on as the number for identifying an RG (RAID group).

The measured IOPS value 164 is information about a measured value of a readable/writable value per second to each RG (RAID group) (access frequency IOPS per second to each RG). An average value of measured values obtained for a certain period of time by periodically (for example, at one-minute intervals) measuring the number of times each RG (RAID group) is read-accessed or write-accessed can be used as the measured IOPS value 164.

Each entry of this measured IOPS value 164 stores a measured value of the access frequency IOPS per second to each RG. For example, 1900 is stored as the measured IOPS value 164 in the entry of the measured IOPS value 164 corresponding to the RG number 162 0x000.

Figure 10:
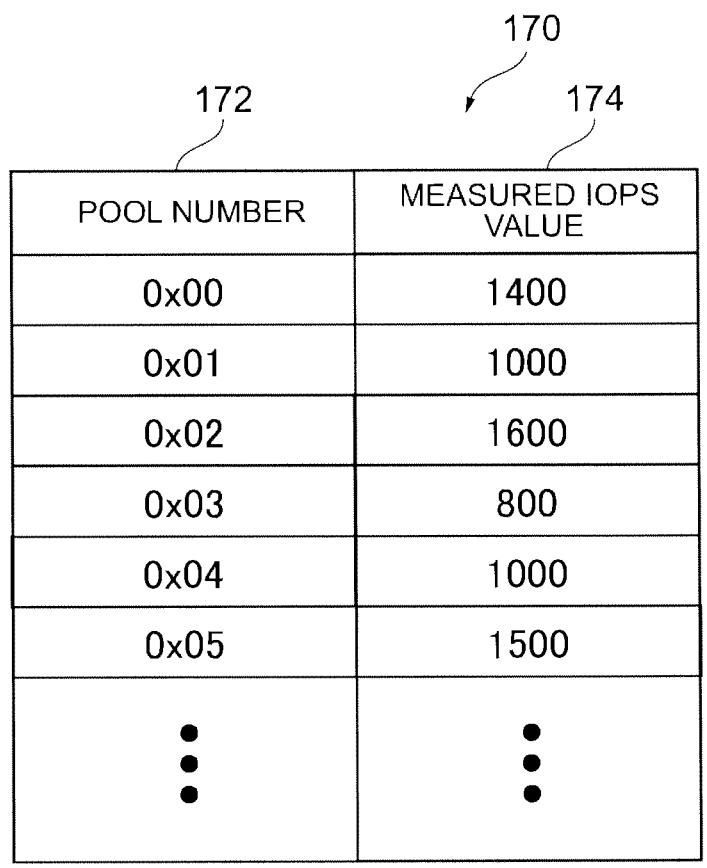
FIG. 10 is a configuration diagram of a measured IOPS value storage table for pools.

Next, FIG. 10 shows a configuration diagram of a measured IOPS value storage table for pools.

Referring to FIG. 10, a measured IOPS value storage table 170 for pools is a table stored in the memory 38 and is constituted from a pool number 172 and a measured IOPS value 174.

The pool number 172 is information about the number for identifying each pool 110. Each entry of the pool number 172 stores, for example, 0x00, 0x01, 0x02, 0x03, 0x04, 0x05, and so on corresponding to each pool 110.

The measured IOPS value 174 is information about a measured value of a readable/writable value per second to each pool 110 (access frequency IOPS per second to each pool 110).

An average value of measured values obtained for a certain period of time by periodically (for example, at one-minute intervals) measuring the number of times each pool 110 is read-accessed or write-accessed can be used as the measured IOPS value 174.

Each entry of the measured IOPS value 174 stores a measured value of the access frequency IOPS per second to each pool 110. For example, 1400 is stored as the measured IOPS value 174 in the entry of the measured IOPS value 174 corresponding to the pool number 172 0x00.

Figure 11:
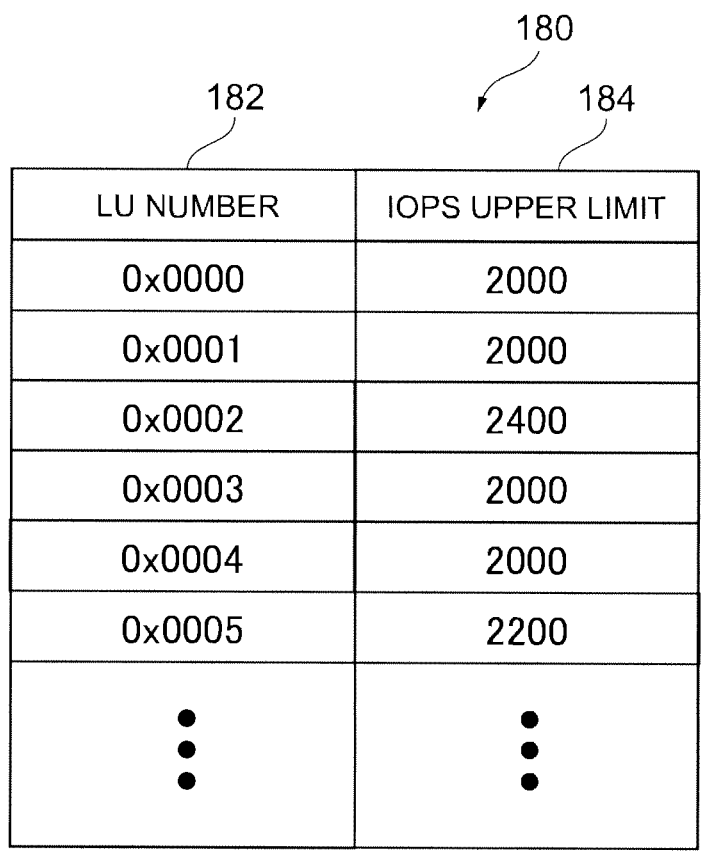
FIG. 11 is a configuration diagram of an IOPS upper limit storage table for LUs.

Next, FIG. 11 shows a configuration diagram of an IOPS upper limit storage table for LUs.

Referring to FIG. 11, an IOPS upper limit storage table 180 for LUs is a table stored in the memory 38 and is constituted from an LU number 182 and an IOPS upper limit 184.

The LU number 182 is information about the number for identifying a normal LU or a virtual LU. Each entry of the LU number 182 stores 0x0000, 0x0001, 0x0002, 0x0003, 0x0004, 0x0005, and so on as the number for identifying a normal LU or a virtual LU.

The IOPS upper limit 184 is information about a total value of IOPS upper limits of HDDs 30 constituting a normal LU or a virtual LU. Each entry of the IOPS upper limit 184 stores a total value of the IOPS upper limits of the HDDs 30 constituting the relevant normal LU or virtual LU. For example, 2000 is stored as the IOPS upper limit 184 in the entry of the IOPS upper limit 184 corresponding to the LU number 182 0x0000.

In this case, the LU number 182 0x0000 is a normal LU and is constituted from the HDDs 30 whose HDD numbers 136 are 0x000, 0x001, 0x002, and 0x003 according to the LU/RG and HDD association table 130; and the IOPS upper limit of each HDD 30 is 500 (a value obtained from the IOPS upper limit 124 of the IOPS upper limit table 120 for HDDs). So, 500*4=2000 is used as the IOPS upper limit 184.

Incidentally, if a normal LU is constituted from a plurality of RGs (RAID groups), an average value of the IOPS upper limits of the HDDs 30 constituting each RG (RAID group) is used as the IOPS upper limit 184.

Figure 12:
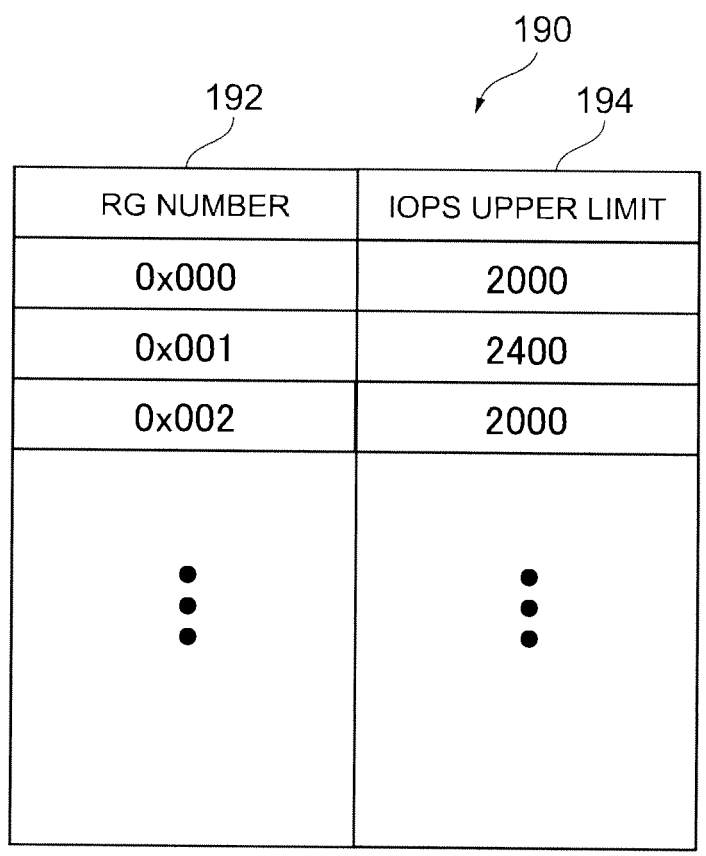
FIG. 12 is a configuration diagram of an IOPS upper limit storage table for RGs.

Next, FIG. 12 shows a configuration diagram of an IOPS upper limit storage table for RGs.

Referring to FIG. 12, an IOPS upper limit storage table 190 for RGs is a table stored in the memory 38 and is constituted from an RG number 192 and an IOPS upper limit 194.

The RG number 192 is information about the number for identifying each RG (RAID group). Each entry of the RG number 192 stores, for example, 0x000, 0x001, 0x002, and so on as the information about the number for identifying each RG (RAID group).

The IOPS upper limit 194 is information about a total value of IOPS upper limits of HDDs 30 constituting each RG (RAID group). For example, the number such as 2000, 2400, 2000, and so on is stored as the information about the total value of the IOPS upper limits of the HDDs 30 constituting each RG (RAID group) in each entry of the IOPS upper limit 194.

Figure 13:
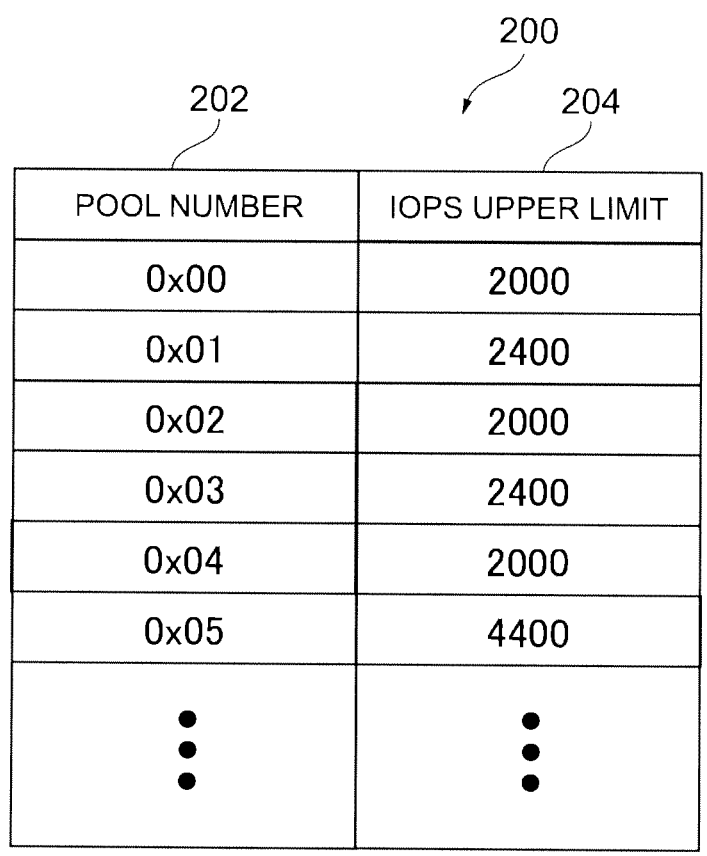
FIG. 13 is a configuration diagram of an IOPS upper limit storage table for pools.

Next, FIG. 13 shows a configuration diagram of an IOPS upper limit storage table for pools.

Referring to FIG. 13, an IOPS upper limit storage table 200 for pools is a table stored in the memory 38 and is constituted from a pool number 202 and an IOPS upper limit 204.

The pool number 202 is information about the number for identifying each pool 110. Each entry of the pool number 202 stores, for example, the number such as 0x00, 0x01, 0x02, 0x03, 0x04, 0x05, and so on as the information about the number for identifying each pool 110.

The IOPS upper limit 204 is information about a total value of IOPS upper limits of HDDs 30 constituting each pool 110. Each entry of the IOPS upper limit 204 stores, for example, the number such as 2000, 2400, 2000, 2400, 2000, 4400, and so on as the information about the total value of the IOPS upper limits of the HDDs 30 constituting each pool 110.

Incidentally, if a plurality of RGs (RAID groups) are allocated to one pool 110, a total value of the IOPS upper limits of the plurality of RGs (RAID groups) is stored in the IOPS upper limit 204.

For example, if RGs (RAID groups) whose RG numbers 144 are 0x005 and 0x006 are allocated to the pool 110 whose pool number 202 is 0x005, 4400 which is the total value of the IOPS upper limits of the respective RGs is stored as the IOPS upper limit 204.

Figure 14:
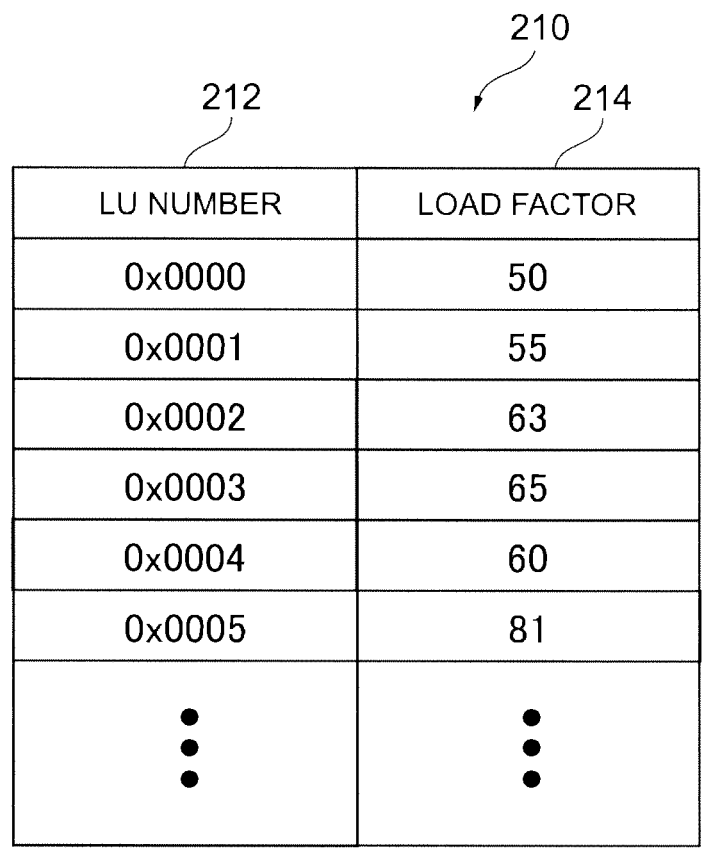
FIG. 14 is a configuration diagram of a load factor storage table for LUs.

Next, FIG. 14 shows a configuration diagram of a load factor storage table for LUs.

Referring to FIG. 14, a load factor storage table 210 for LUs is a table stored in the memory 38 and is constituted from an LU number 212 and a load factor 214.

The LU number 212 is information about the number for identifying a normal LU or a virtual LU. Each entry of the LU number 212 stores, for example, 0x0000, 0x0001, 0x0002, 0x0003, 0x0004, 0x0005, and so on as the information about the number for identifying a normal LU or a virtual LU.

The load factor 214 is a value indicating a ratio of the measured IOPS value 154 stored in the measured IOPS value storage table 150 for LUs to the IOPS upper limit 184 stored in the IOPS upper limit storage table 180 for LUs.

Each entry of the load factor 214 stores, for example, 50, 55, 63, 65, 60, 81, and so on as a value of the measured IOPS value 154/the IOPS upper limit 184.

In this case, the measured IOPS value 154 of a normal LU whose LU number 212 is 0x0000 is 1000 (a value stored in the measured IOPS value storage table 150 for LUs) and the IOPS upper limit 184 is 2000 (a value stored in the IOPS upper limit storage table 180 for LUs), so the resultant load factor is as follows: the load factor=2000/1000*100=50%.

Figure 15:
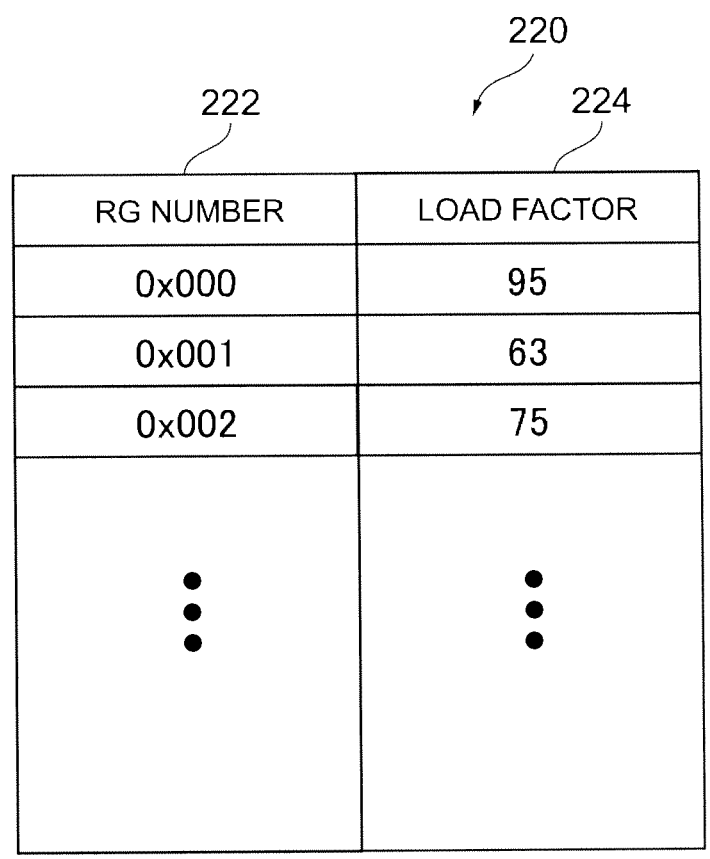
FIG. 15 is a configuration diagram of a load factor storage table for RGs.

Next, FIG. 15 shows a configuration diagram of a load factor storage table for RGs.

Referring to FIG. 15, a load factor storage table 220 for RGs is a table stored in the memory 38 and is constituted from an RG number 222 and a load factor 224.

The RG number 222 is information about the number for identifying an RG (RAID group). Each entry of the RG number 222 stores, for example, the number such as 0x000, 0x001, 0x002, and so on as the information about the number for identifying an RG (RAID group).

The load factor 224 is a value indicating a ratio of the measured IOPS value 164 stored in the measured IOPS value storage table 160 for RGs to the IOPS upper limit 194 stored in the IOPS upper limit storage table 190 for RGs.

Each entry of the load factor 224 stores, for example, 95, 63, 75, and so on as a value of the measured IOPS value 164/the IOPS upper limit 194.

Figures 16, 17:
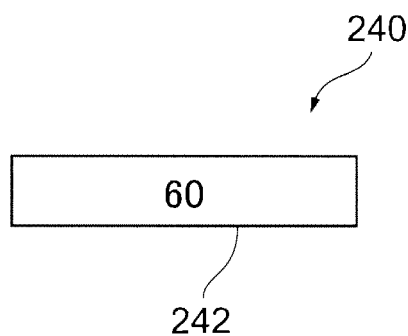
FIG. 16 is a configuration diagram of a load factor storage table for pools.
FIG. 17 is a configuration diagram of a CPU activity ratio storage table.

Next, FIG. 16 shows a configuration diagram of a load factor storage table for pools.

Referring to FIG. 16, a load factor storage table 230 for pools is a table stored in the memory 38 and is constituted from a pool number 232 and a load factor 234.

The pool number 232 is information about the number for identifying each pool 110. Each entry of the pool number 232 stores, for example, 0x00, 0x01, 0x02, 0x03, 0x04, 0x05, and so on as the information about the number for identifying each pool 110.

The load factor 234 is a value indicating a ratio of the measured IOPS value 174 stored in the measured IOPS value storage table 170 for pools to the IOPS upper limit 204 stored in the IOPS upper limit storage table 200 for pools.

Each entry of the load factor 244 stores, for example, 70, 42, 80, 33, 50, 68, and so on as a value of the measured IOPS value 174/the IOPS upper limit 204.

Next, FIG. 17 shows a configuration diagram of a CPU activity ratio storage table.

Referring to FIG. 17, a CPU activity ratio storage table 240 is a table stored in the memory 38 and is constituted from a CPU activity ratio 242.

The CPU activity ratio 242 is information about an activity ratio of the CPU 40 (activity ratio of the microprocessor constituting the controller 22). An average value (for example, 60) of measured values obtained for a certain period of time by periodically (for example, at one-minute intervals)

measuring the information about the activity ratio of the CPU 40 can be used as the CPU activity ratio 242.

Figure 18:
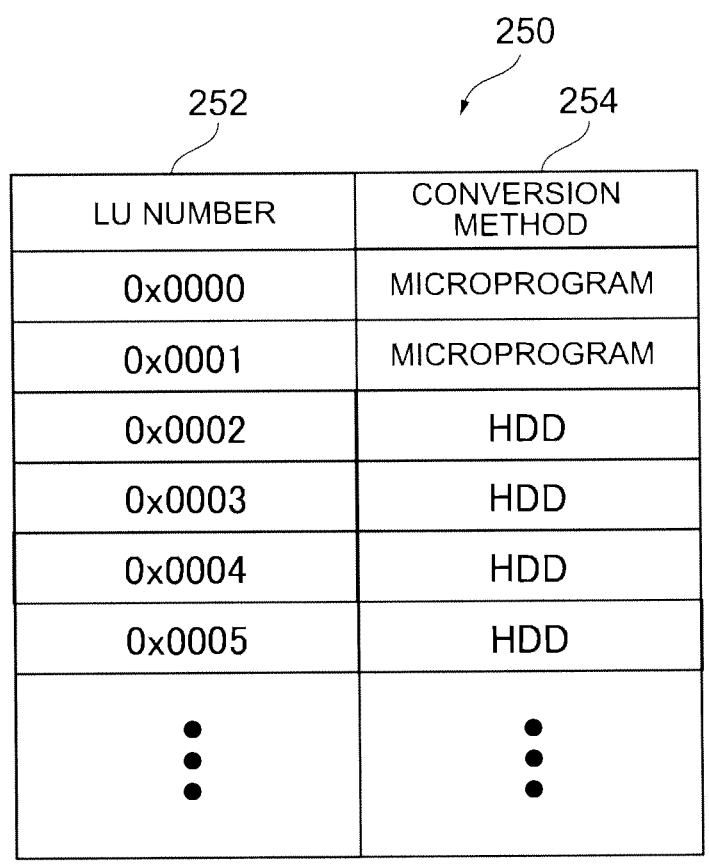
FIG. 18 is a configuration diagram of a conversion method storage table for LUs.

Next, FIG. 18 shows a configuration diagram of an LU conversion method storage table.

Referring to FIG. 18, an LU conversion method storage table 250 is a table stored in the memory 38 and is constituted from an LU number 252 and a conversion method 254.

The LU number 252 is information about the number for identifying a normal LU or a virtual LU. Each entry of the LU number 252 stores, for example, 0x0000, 0x0001, 0x0002, 0x0003, 0x0004, 0x0005, and so on as the number for identifying a normal LU or a virtual LU.

The conversion method 254 is information used to: judge whether the first data conversion processing or the second data conversion processing should be executed by the microprogram activated by the CPU 40 if the ratio (load factor/CPU activity ratio) of the load factor 214 (value of the load factor storage table 210 for LUs) of the relevant normal LU or virtual LU to the CPU activity ratio 242 (value of the CPU activity ratio storage table 240) exceeds a threshold, for example, 1; and judge whether the first data conversion processing or the second data conversion processing should be executed by the emulator 32 if the ratio of the load factor 214 of the relevant normal LU or virtual LU to the CPU activity ratio 242 is equal to or less than 1 (threshold).

Each entry of the conversion method 254 stores: microprogram information if the microprogram activated by the CPU 40 executes the first data conversion processing or the second data conversion processing; and HDD information if the emulator 32 executes the first data conversion processing or the second data conversion processing.

For example, if the load factor of a normal LU whose LU number 252 is 0x0000 is 50(%) and the CPU activity ratio 242 is 60(%), the ratio of the load factor to the CPU activity is 50/60 (load factor/CPU activity ratio=50/60), that is, less than 1, the HDD information is stored in the entry of the conversion method 254 corresponding to the LU number 252 0x0000.

However, the information stored in the conversion method 254 is updated according to periodical changes of the activity ratio of the CPU 40 or the load factor of the normal LU. For example, if the load factor of the normal LU whose LU number 252 is 0x0000 is 50(%) and the CPU activity ratio 242 changes from 60(%) to 40(%), the ratio of the load factor to the CPU activity is 50/40, that is, more than 1 (load factor/CPU activity ratio=50/40>1). So, the microprogram information is stored in the entry of the conversion method 254 corresponding to the LU number 252 0x0000.

Figure 19:
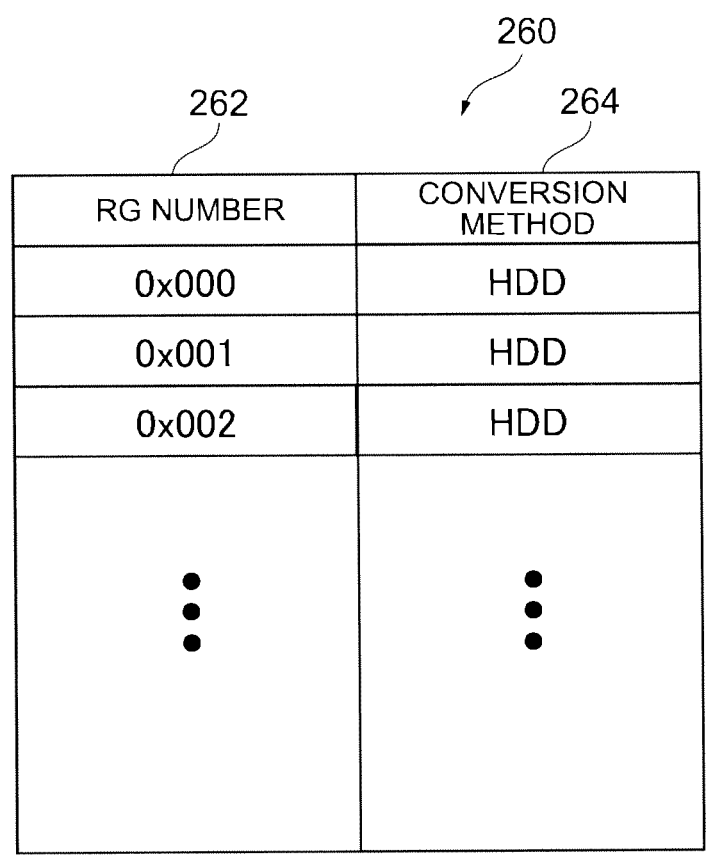
FIG. 19 is a configuration diagram of a conversion method storage table for RGs.

Next, FIG. 19 shows a configuration diagram of an RG conversion method storage table.

Referring to FIG. 19, an RG conversion method storage table 260 is a table stored in the memory 38 and is constituted from an RG number 262 and a conversion method 264.

The RG number 262 is information about the number for identifying an RG (RAID group). Each entry of the RG number 262 stores, for example, 0x000, 0x001, 0x002, and so on as the information about the number for identifying an RG (RAID group).

The conversion method 264 is information used to: judge whether the first data conversion processing or the second data conversion processing should be executed by the microprogram activated by the CPU 40 if the ratio (load factor/CPU activity ratio) of the load factor 224 (value of the load factor storage table 220 for RGs) to the CPU activity ratio 242 (value of the CPU activity ratio storage table 240) exceeds a threshold, for example, 1; and judge whether the first data conversion processing or the second data conversion processing should be executed by the emulator 32 if the ratio of the load factor 224 of the relevant RG (RAID group) to the CPU activity ratio 242 is equal to or less than 1(threshold).

Each entry of the conversion method 264 stores: microprogram information if the microprogram activated by the CPU 40 executes the first data conversion processing or the second data conversion processing; and HDD information if the emulator 32 executes the first data conversion processing or the second data conversion processing.

Next, FIG. 20 shows a configuration diagram of a pool conversion method storage table.

Referring to FIG. 20, a pool conversion method storage table 270 is a table stored in the memory 38 and is constituted from a pool number 272 and a conversion method 274.

The pool number 272 is information about the number for identifying each pool 110. Each entry of the pool number 272 stores, for example, 0x00, 0x01, 0x02, 0x03, 0x04, 0x05, and so on as the information about the number for identifying each pool 110.

The conversion method 274 is information used to: judge whether the first data conversion processing or the second data conversion processing should be executed by the microprogram activated by the CPU 40 if the ratio (load factor/CPU activity ratio) of the load factor 234 (value of the load factor storage table 230 for pools) of the pool 110 to the CPU activity ratio 242 (value of the CPU activity ratio storage table 240) exceeds a threshold, for example, 1; and judge whether the first data conversion processing or the second data conversion processing should be executed by the emulator 32 if the ratio of the load factor 234 of the pool 110 to the CPU activity ratio 242 is equal to or less than 1 (threshold).

Each entry of the conversion method 274 stores: microprogram information if the microprogram activated by the CPU 40 executes the first data conversion processing or the second data conversion processing; and HDD information if the emulator 32 executes the first data conversion processing or the second data conversion processing.

Storing various tables in the memory 38 enables the CPU 40 to: manage, for example, LUs which are access targets of the access requester, by dividing them into a plurality of normal LUs and a plurality of virtual LUs; and manage its load (load on the CPU 40) by associating it with each normal LU, an RG(s) (RAID group(s)) to which each normal LU belongs, or each pool 110 corresponding to each virtual LU.

The CPU 40 can manage its load corresponding to each normal LU by using the ratio of the load factor of each normal LU to the CPU activity ratio; manage its load corresponding to an RG to which each normal LU belongs, by using the ratio of the load factor of the RG, to which each normal LU belongs, to the CPU activity ratio; and manage its load associated with each pool 110 corresponding to each virtual LU by using the ratio of the load factor of each pool 110 to the CPU activity ratio.

Under this circumstance, if any of the normal LUs is designated as an access target by an access request from the host (access requester) 10, the CPU 40 can judge whether the ratio of the load factor of the designated normal logical LU to the CPU activity ratio or the ratio of the load factor of the RG, to which the designated normal LU belongs, to the CPU activity ratio, that is, its load, exceeds the threshold or not.

Furthermore, if any of the virtual LUs is designated as an access target by an access request from the host (access requester) 10, the CPU 40 can judge whether the ratio of the load factor of the pool 110 corresponding to the designated virtual LU to the CPU activity ratio, that is, its load, exceeds the threshold or not.

Then, if the CPU 40 determines that its load exceeds the threshold, it recognizes that its load is lower than the load on the emulator 32; and executes, in the cache memory (buffer) 44, the first data conversion processing for converting data relating to the LU(s), which is an access target of the access requester, from data of the first block size (520 B) into data of the second block size (4 kB) or the second data conversion processing for converting the access target data from the second block size (4 kB) into the first block size (520 B). If the CPU 40 determines that its load does not exceed the threshold, it recognizes that its load is higher than the load on the emulator 32, the CPU 40 can give a command to the emulator to execute the first data conversion processing or the second data conversion processing.

The emulator 32 executes the first data conversion processing based on the command (command associated with a write access request) from the CPU 40 and executes the second data conversion processing based on the command (command associated with a read access request) from the CPU 40.

Furthermore, in the process of executing the data input/output processing on the cache memory (buffer) 44, the CPU 40 manages its load by comparing it with the load on the emulator 32. If the CPU 40 receives an access request from the access requester, it can determine that its load exceeds the threshold on condition that its load is lower than the load on the emulator 32; and it can determine that its load does not exceed the threshold on condition that its load is higher than the load on the emulator 32.

The specific details of various processing by the storage apparatus 12 will be hereinafter explained.

Write processing by the storage apparatus 12 will be explained with reference to a flowchart in FIG. 21.

Firstly, when the front-end 22 for the controller #0 22 receives 512-B data as write data together with a write access request as an access request from the host 10 (S11), the CPU 40 adds an 8-B guarantee code to the received data in the cache memory 44 and generates 520-B new data as data of the first block size (S12), and executes conversion method judgment processing based on the LUN (LU number) added to the write access request (S13).

After a judgment result of the conversion method judgment processing is obtained, the CPU 40 refers to any one of the conversion method storage tables 250, 260, 270 in the cache memory 44, checks the conversion method obtained in step S13, and sets a conversion method identification flag to the new data (S14).

For example, if the microprogram is adopted as the conversion method, 1 is set as the flag; and if the HDD is adopted as the conversion method, 0 is set as the flag.

Next, the CPU 40 judges, based on the judgment result of the conversion method judgment processing, whether the conversion method is the conversion by the microprogram or not (S15); and if it is determined that the conversion method is the conversion by the microprogram, the CPU 40 proceeds to conversion processing by the microprogram (S16); and if it is determined that the conversion method is not the conversion by the microprogram, the CPU 40 proceeds to conversion processing by the HDD (S 17), thereby terminating the processing in this routine.

In step S16, the microprogram executes the first data conversion processing for converting data of the first block size (520 B) into data of the second block size (4 KB). In step S17, the emulator 32 executes the first data conversion processing for converting data of the first block size (520 B) into data of the second block size (4 KB).

Next, the specific details of the conversion method judgment processing will be explained with reference to a flowchart in FIG. 22.

Figure 21:
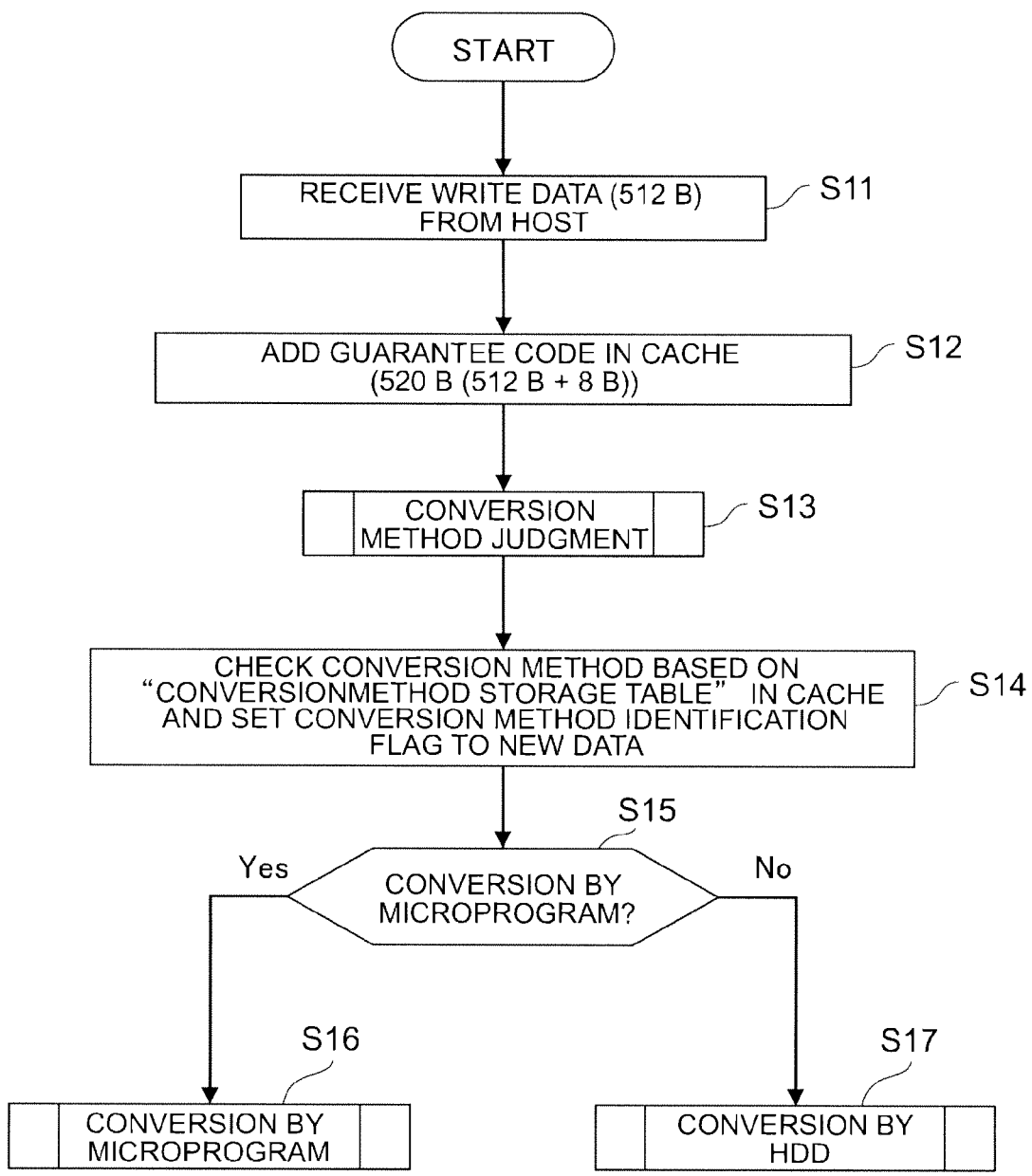
FIG. 21 is a flowchart explaining block size conversion processing when writing data.

This processing is the detailed content of the conversion method judgment processing in step S13 in FIG. 21 and is processing for judging whether the conversion by the microprogram or the conversion by the HDD should be executed on an LU, RG, or pool basis.

Firstly, if the front-end 36 for the controller #0 22 receives a write access request including the write data, LBA, and LUN from the host 10 (S21), the CPU 40 refers to the LU type table 100 based on the LUN added to the write access request, executes processing for judging the target LU type from the LU type table 100 (S22), and judges whether the target LU is a virtual LU or not (S23).

If it is determined that the target LU is a virtual LU, the CPU 40 refers to the management area 108, identifies a pool 110 allocated to the virtual LU, refers to the pool conversion method storage table 270 based on the pool number 272 of the identified pool 110 (S24), judges whether the conversion method is the conversion by the microprogram or the HDD, and obtains the result of this judgment, thereby terminating the processing in this routine.

On the other hand, if it is determined in step S23 that the target LU is not a virtual LU, that is, the target LU is a normal LU, the CPU 40 refers to the LU/RG and HDD association table 130 based on the LU number, executes processing for judging whether or not the normal LU belongs to a plurality of RGs (RAID groups) (S25), and then judges whether or not the normal LU belongs to a plurality of RGs (S26).

If it is determined that the normal LU belongs to a plurality of RGs, the CPU 40 refers to the LU conversion method storage table 250 based on the LU number (S27), judges whether the conversion method is the conversion by the microprogram or the HDD, and then obtains the result of this judgment, thereby terminating the processing in this routine.

On the other hand, if it is determined in step S26 that the normal LU does not belong to a plurality of RGs (RAID groups), that is, the normal LU belongs to one RG, the CPU 40 refers to the RG conversion method storage table 260 based on the RG number 262, judges whether the conversion method is the conversion by the microprogram or the HDD, and then obtains the result of this judgment, thereby terminating the processing in this routine.

Figure 23:
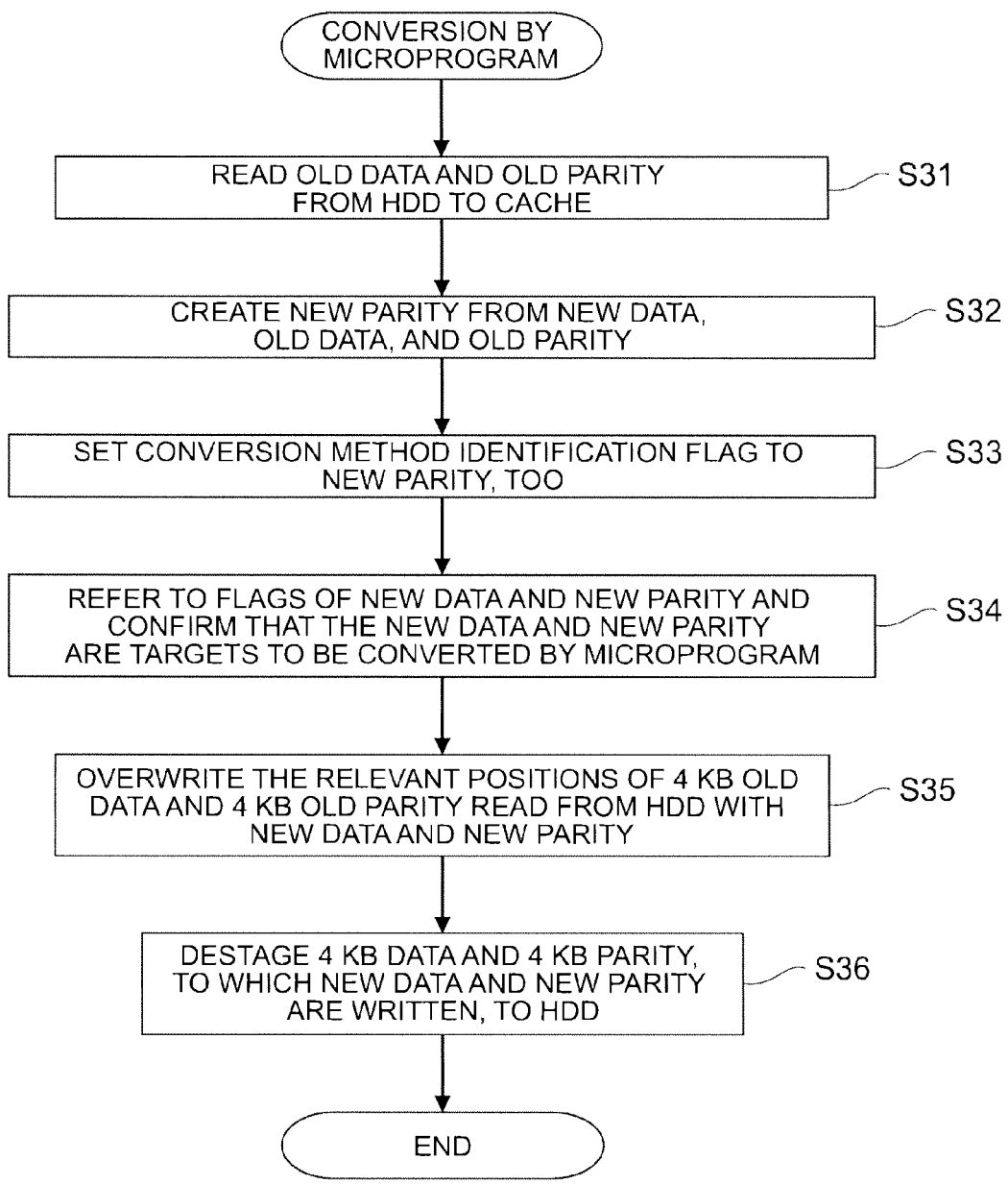
FIG. 23 is a flowchart explaining conversion processing when writing data.

Next, the specific details of the conversion processing by the microprogram will be explained with reference to a flowchart in FIG. 23.

This processing is the detailed content of the processing in step S16 in FIG. 21 and is processing executed by the microprogram for converting 520-B data into 4-kB data.

Firstly, the microprogram reads old data (4 kB) and old parity (4 kB) from the HDD 30 to the cache memory 44 based on the LBA added to the write access request (S31).

Next, the microprogram creates new parity (520 B) from the generated new data (520 B), and the old data and old parity read from the HDD 30 (S32) and sets the conversion method identification flag, for example, 1, to the new parity (S33).

The microprogram then refers to the flags of the new data and the new parity and confirms that the new data and the new parity are targets of conversion by the microprogram (S34).

Subsequently, the microprogram overwrites and modifies the relevant positions of the old data (4 kB) and old parity (4 kB) read from the HDD 30 with the new data (520 B) or the new parity (520 B) (S35) and executes destaging processing for writing data (4 kB), in which the new data (520 B) is written, and parity (4 kB), in which the new parity (520 B) is written, respectively to the HDD 30 (S36), thereby terminating the processing in this routine.

In this case, RMW (Read Modify Write) processing is executed by the microprogram in step S35 and step S36.

Figure 24:
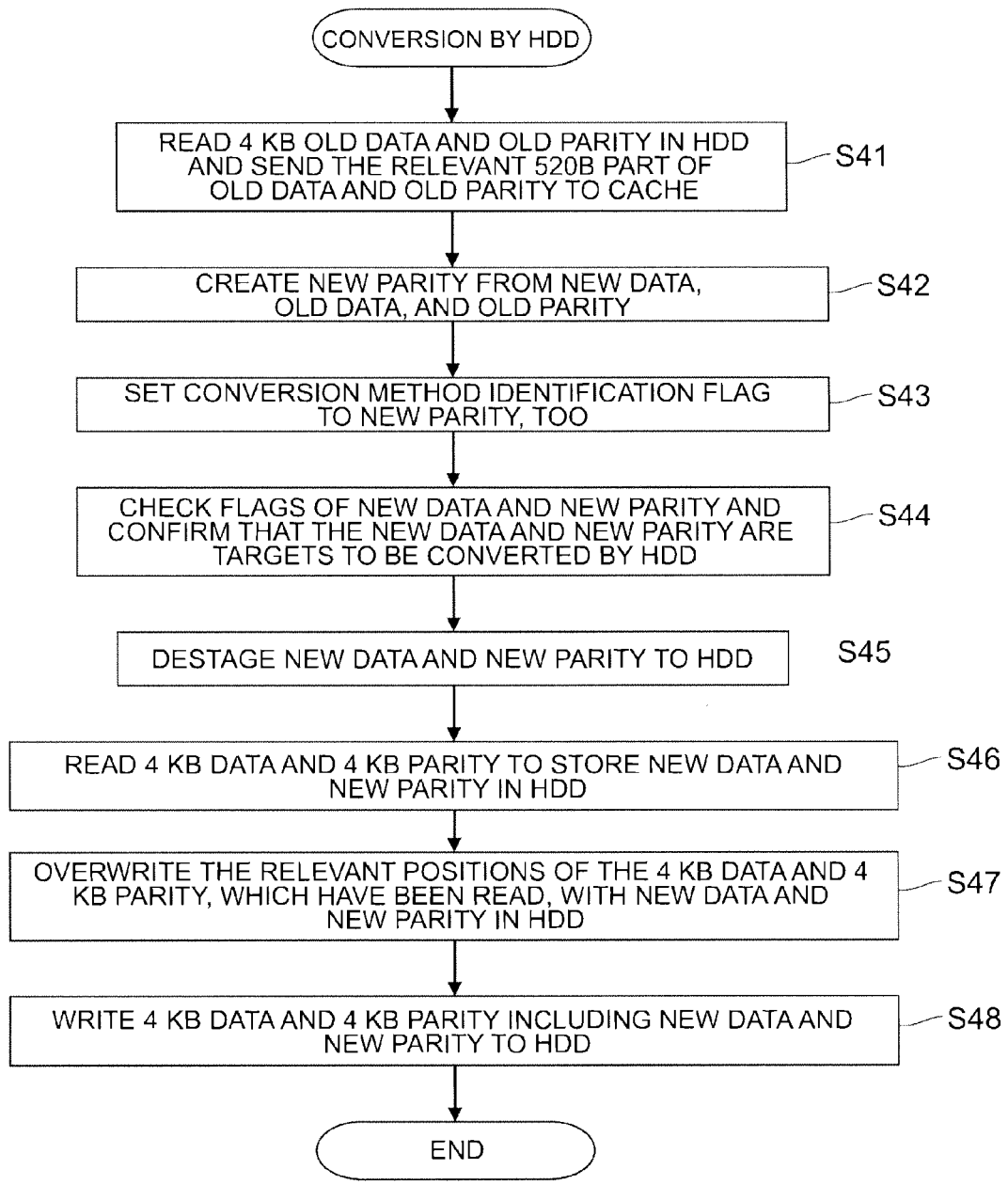
FIG. 24 is a flowchart explaining conversion processing by the HDD when writing data.

Next, the specific content of the conversion processing by the HDD will be explained with reference to a flowchart in FIG. 24.

This processing is the specific content of the processing in step 17 in FIG. 21 and is processing executed by the emulator 32 for converting 520-B data into 4-kB data.

This processing is started on condition that the emulator 32 for the HDD 30 receives a command from the CPU 40 to execute the first data conversion processing.

Firstly, the emulator 32 reads 4-kB data, including old data, and 4-kB parity, including old parity, in the HDD based on the LBA transferred together with the command from the CPU 40 to execute the first data conversion processing, extracts the relevant old data (520 B) and old parity (520 B) from the read data and parity, and transfers them to the cache memory 44 (S41).

Next, the microprogram creates new parity (520 B) from the generated new data (520 B) and the old data (520 B) and old parity (520 B) transferred from the emulator 32 (S42) and sets 0 as the conversion method identification flag, for example, a flag indicating the method of conversion by the HDD, to the new parity (S43).

Then, the microprogram refers to the flags of the new data and the new parity, confirms that the new data and the new parity are targets of conversion using the method of conversion by the HDD (S44), and destages the 520-B new data and the 520-B new parity, respectively, to the HDD 30 (S45).

Subsequently, in order to store the 520-B new data and 520-B new parity, which have been transferred from the microprogram, in the HDD 30, the emulator 32 reads the 4-kB data and the 4-kB parity from the HDD 30 which is a storage location (S46) and overwrites and modifies the relevant positions of the 4-kB data and the 4-kB parity, which have been read, in the HDD 30 with the 520-B new data and the 520-B new parity, respectively (S47).

Then, the emulator 32 writes the 4-kB data, including the 520-B new data, and the 4-kB parity, including the 520-B new parity, respectively as data of the second block size to the HDD 30 which is the storage location (S48), thereby terminating the processing in this routine.

In this case, the RMW processing is executed by the emulator 32 in step S46 to S48.

Next, the specific content of the block size conversion processing when reading data will be explained with reference to a flowchart in FIG. 25.

This processing is processing for converting data of the second block size (4 kB) into data of the first block size (520 B) when reading data.

Firstly, when the front-end 36 for the controller 22 receives a read access request from the host 10 (S51), the CPU 40 executes conversion method judgment processing based on the LUN (LU number) and LBA added to the read access request (S52).

Figure 22:
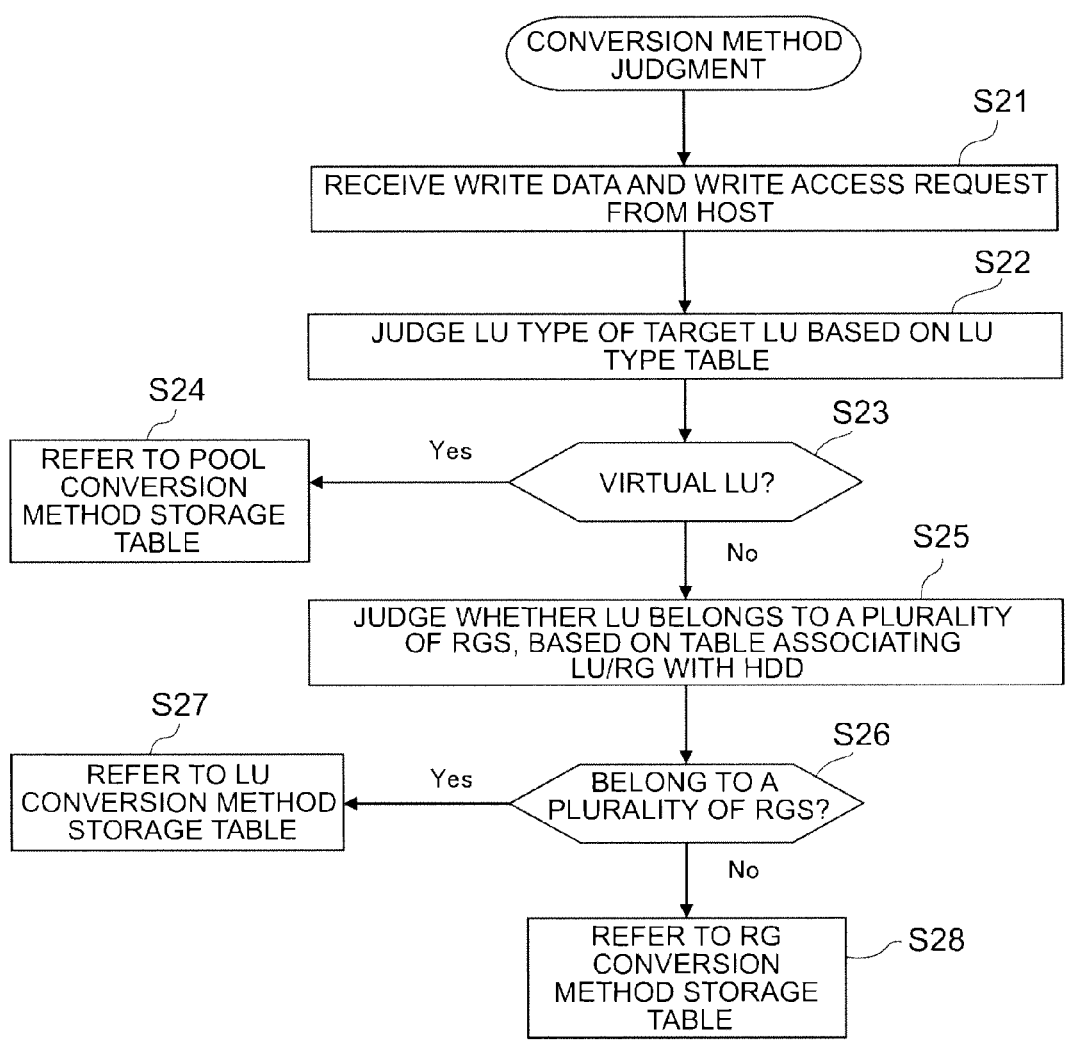
FIG. 22 is a flowchart explaining conversion method judgment processing.

In this processing similar to the conversion method judgment processing shown in FIG. 22, the CPU 40 refers to the LU type table 100 based on the LU number added to the read access request; refers to the pool conversion method storage table 270 if the target LU type is a virtual LU; refers to the LU conversion method storage table 250 or the RG conversion method storage table 260 if the target LU type is a normal LU; and judges whether the conversion method is the conversion by the microprogram or the HDD, thereby obtaining the judgment result.

Next, the CPU 40 checks the conversion method storage table 250, 260, 270 to see if the method for converting the read target data is the conversion by the microprogram or the conversion by the HDD, based on the conversion method judgment result (S53); and judges whether the conversion method is the conversion by the microprogram or not (S54). If it is determined that the conversion method is the conversion by the microprogram, the CPU 40 executes the conversion processing by the microprogram (S55), thereby terminating the processing in this routine. If it is determined that the conversion method is not the conversion by the microprogram, the CPU 40 executes the conversion processing by the HDD (S56), thereby terminating the processing in this routine.

Figure 26:
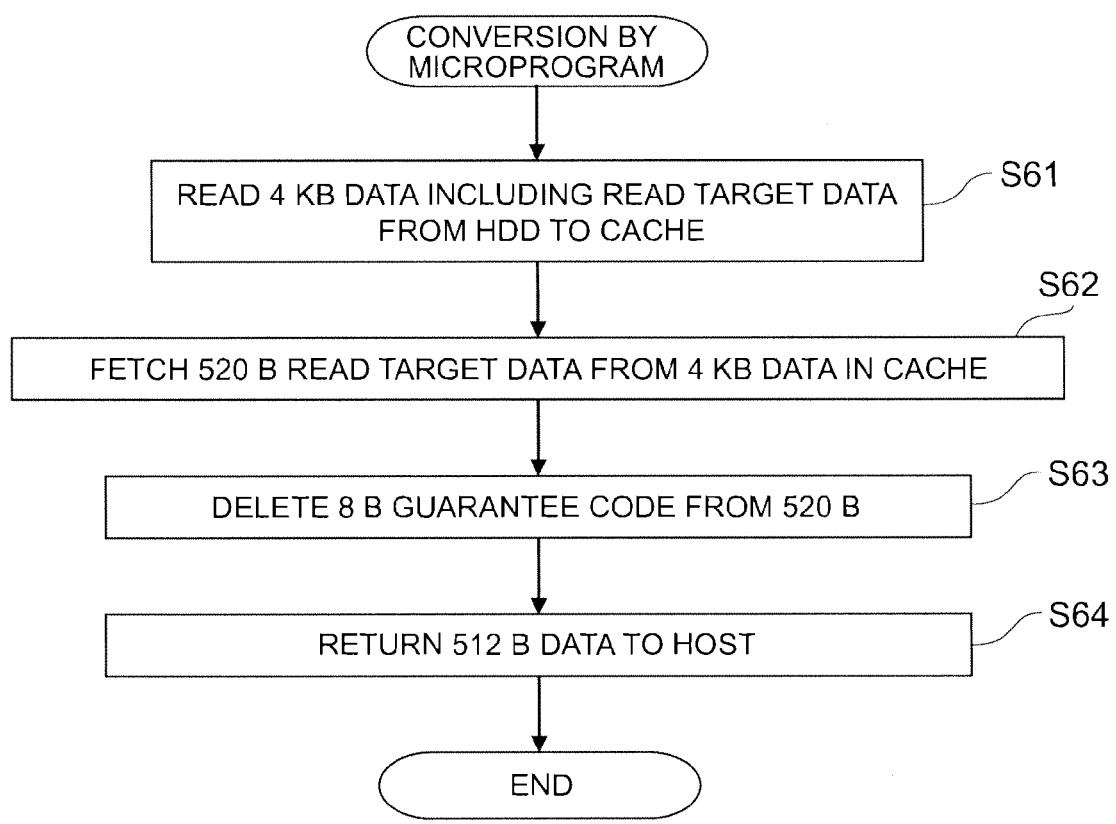
FIG. 26 is a flowchart explaining conversion processing by a microprogram when reading data.

Next, the specific content of the conversion processing by the microprogram when reading data will be explained with reference to a flowchart in FIG. 26.

Figure 25:
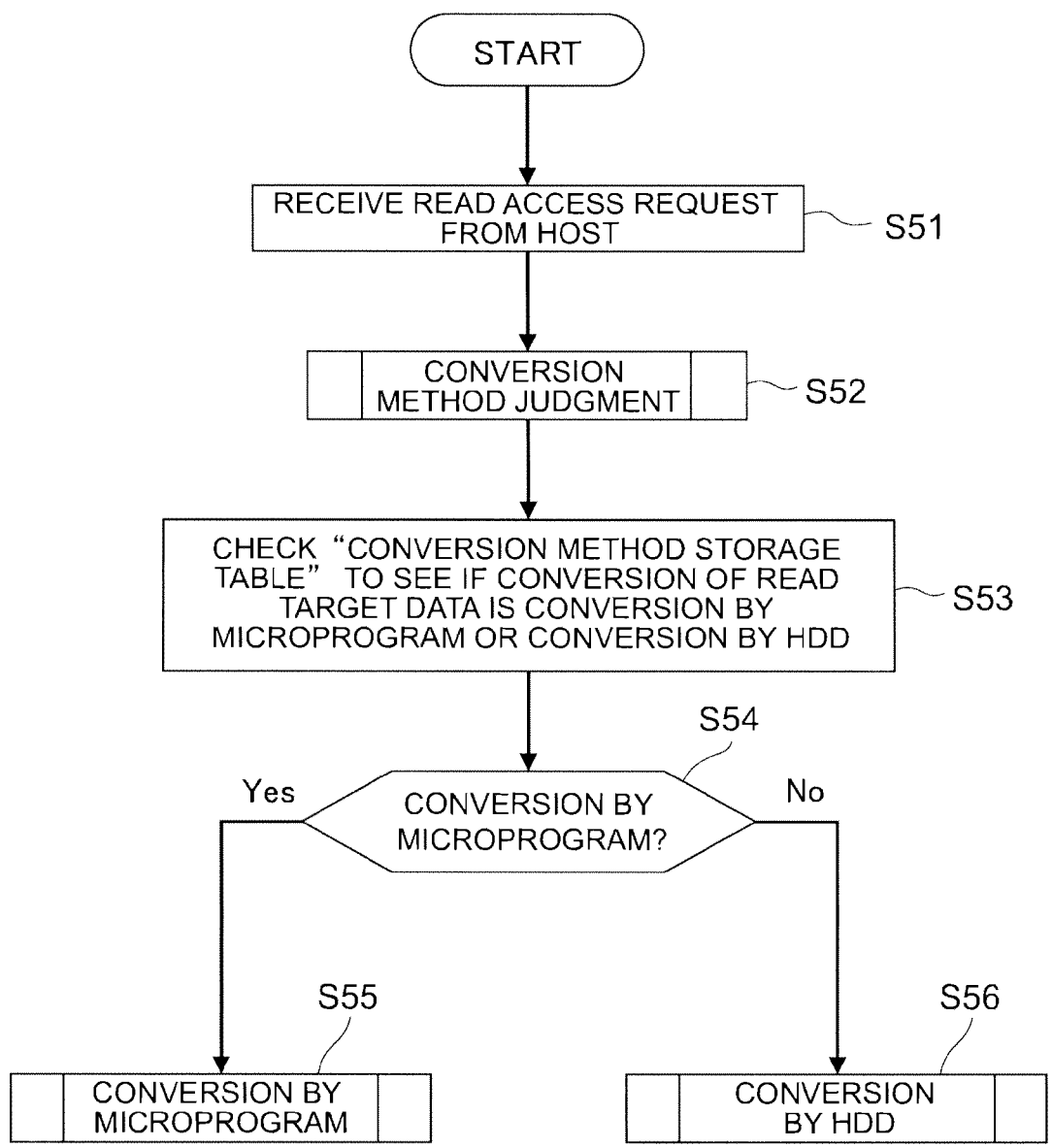
FIG. 25 is a flowchart explaining block size conversion processing when reading data.

This processing is the specific content of the processing in step S55 in FIG. 25 and is processing executed when reading data for converting data of the second block size (4 kB) into data of the first block size (520 B) and then generating 512-B data from the first block size (520 B).

Firstly, the microprogram reads 4-kB data, including read target data, from the HDD 30 to the cache memory 44 based on the LBA added to the read access request (S61).

Next, the microprogram fetches 520-B data as the read target data from the 4-kB data in the cache memory 44 (S62), deletes the guarantee code (8 B) from the fetched 520-B data (S63), and sends the 512-B data to the host 10 (S64), thereby terminating the processing in this routine.

Figure 27:
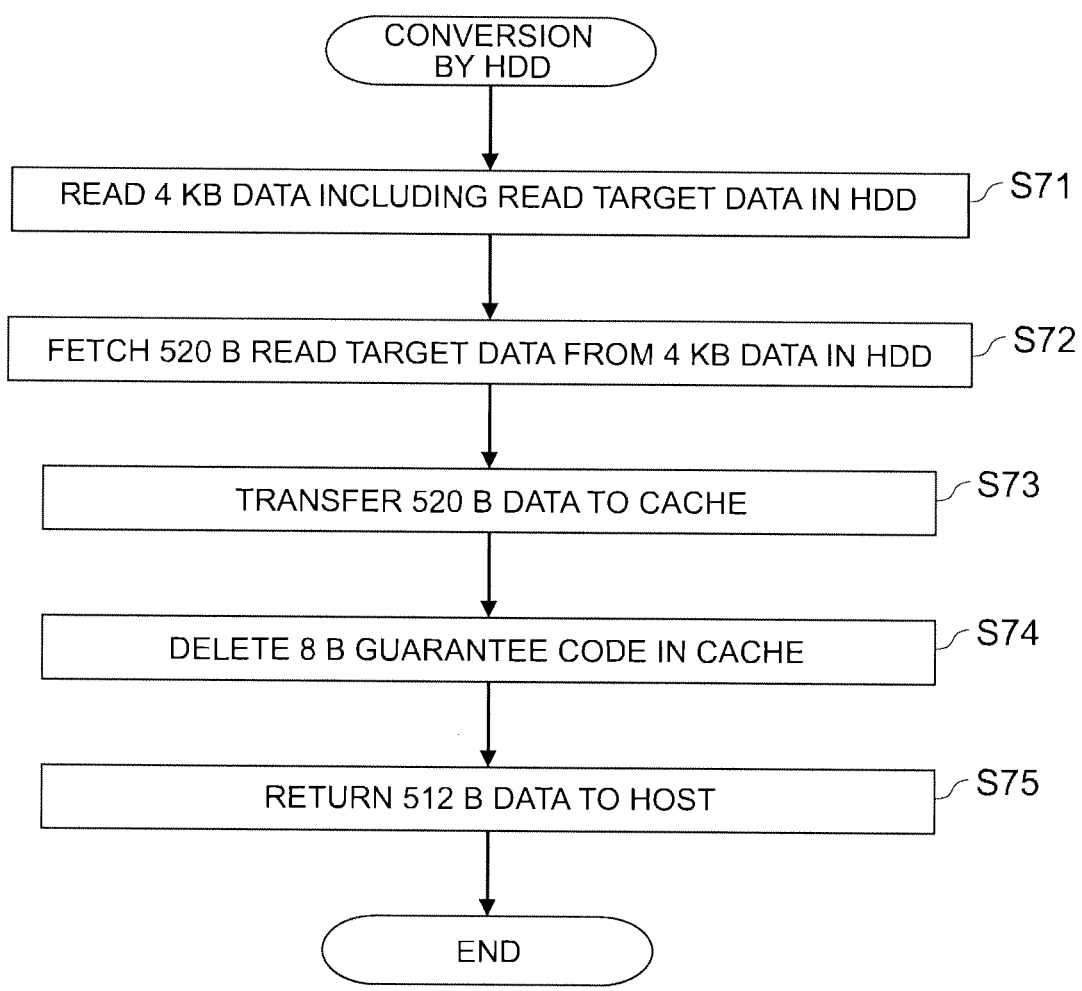
FIG. 27 is a flowchart explaining conversion processing by the HDD when reading data.

Next, the specific content of the conversion processing by the HDD when reading data will be explained with reference to a flowchart in FIG. 27.

This processing is the specific content of the processing in step S56 in FIG. 25 and is processing for converting data of the second block size (4 kB) into data of the first block size (520 B) and then generating 512-B data from the data of the first block size (520 B).

Firstly, the emulator 32 reads 4-kB data including the read target data from the HDD 30 based on the LBA transferred from the CPU 40 together with the command to execute the second data conversion processing (S71), fetches 520-B data as the read target data from the read 4-kB data (S72), and transfers the fetched 520-B data to the cache memory 44 (S73).

Next, the microprogram fetches the guarantee code (8 B) from the 520-B data, which has been transferred from the emulator 32, in the cache memory 44 and generates 512-B data (S74), and transfers the generated 512-B data as the read data to the host 10 (S75), thereby terminating the processing in this routine.

According to this embodiment, the first data conversion processing or the second data conversion processing is executed by either the CPU 40 or the emulator 32 which has a lower load. So, degradation of the data input/output processing performance by the CPU 40 and the emulator 32 can be inhibited and the storage apparatus can be operated without degradation of the data input/output processing performance.

Furthermore, if the first data conversion processing or the second data conversion processing is executed by either the CPU 40 or the emulator 32 which has a lower load according to this embodiment, the first data conversion processing or the second data conversion processing can be executed on an LU basis, an RG basis, or a pool basis.

If the first data conversion processing or the second data conversion processing is executed on an LU basis, an RG basis, or a pool basis, the load on the CPU 40 can be judged accurately by distinguishing which RG constitutes the relevant LU, or which RG constitutes the relevant virtual LU.

Incidentally, the present invention is not limited to the aforementioned embodiment, and includes various variations. For example, the aforementioned embodiment has been described in detail in order to explain the invention in an easily comprehensible manner and is not necessarily limited to those having all the configurations explained above.

Furthermore, part or all of the aforementioned configurations, functions, processing units, processing means, and so on may be realized by hardware by, for example, designing them in integrated circuits. Also, each of the aforementioned configurations, functions, and so on may be realized by software by the processors interpreting and executing programs for realizing each of the functions. Information such as programs, tables, and files for realizing each of the functions may be recorded and retained in memories, storage devices such as hard disks and SSDs (Solid State Drives), or storage media such as IC (Integrated Circuit) cards, SD (Secure Digital) memory cards, and DVDs (Digital Versatile Discs).

REFERENCE SIGNS LIST

10 Host computer (host)
12 Storage apparatus
14 Network
18 Controller chassis
20 Drive chassis
22, 24 Controller
30 HDD
32 Emulator
34, 36 Front-end
38 Memory
40 CPU
42 Switch controller
44 Cache memory
46, 48 Back-end
54, 56 Front-end
58 Memory
60 CPU
62 Switch controller
64 Cache memory
66, 68 Back-end

The invention claimed is:

1. A storage apparatus comprising:
a storage controller comprising a processor configured to convert data which is sent to or received from a computer via a network, based on a determination whether the processor executes a first data conversion processing or not;
a plurality of storage devices, each of the storage devices comprising a storage medium and a device controller configured to convert data based on a command from the storage controller, for instructing to execute the first data conversion processing or a second data conversion processing;
wherein the storage controller is configured to manage a load of the storage controller by associating it with one or more logical units which are access targets of the computer in executing the data conversion processing on a cache memory; and when the storage controller receives an access request from the computer, the storage controller is configured to judge whether the load of the storage controller exceeds a threshold or not; and when the storage controller determines that the load of the storage controller exceeds the threshold, the storage controller is configured to execute, on the cache memory, the first data conversion processing for converting data relating to the logical units, which are the access targets of the computer, from a first block size into a second block size or the second data conversion processing for converting the data from the second block size into the first block size; and when the storage controller determines that the load of the storage controller does not exceed the threshold, the storage controller gives a command to the device controller of one of the plurality of storage devices to execute the first data conversion processing or the second data conversion processing; and wherein the device controller executes the first data conversion processing or the second data conversion processing based on the command from the storage controller, wherein the storage controller is configured to manage the load of the storage controller by comparing it with a load on the device controller and selecting the storage controller or the device controller to execute the data conversion based on which of the storage controller or the device controller bears the lower load.

2. The storage apparatus according to claim 1,
wherein when the access request from the computer is a write access request, the storage controller is configured to perform the following actions as the first data conversion processing:
reading the data of the second block size, including old data which is a write access target requested by the write access request, from the storage devices which are access destinations designated by the write access request, from among the storage devices, to the cache memory;
updating the data of the second block size, which has been read to the cache memory, with new data of the first block size including write data added to the write access request; and
transferring the updated data of the second block size to the storage devices which are the access destinations designated by the write access request,
wherein when the access request from the computer is a read access request, the storage controller is configured to perform the following actions as the second data conversion processing:
reading the data of the second block size including data, which is a read access target requested by the read access request, from the storage devices which are access destinations designated by the read access request, from among the storage devices, to the cache memory;
fetching data, which is the read access target requested by the read access request, from the data of the second block size which has been read to the cache memory; and
processing the fetched data as the data of the first block size,
wherein when the access request from the computer is a write access request, the device controller is configured to perform the following actions as the first data conversion processing:
reading the data of the second block size including old data, which is a write access target requested by the write access request, from the storage devices which are access destinations designated by the write access request, from among the storage devices;

updating the data of the second block size, which has been read, with new data of the first block size including write data added to the write access request; and storing the updated data of the second block size in the storage devices which are the access destinations designated by the write access and request, wherein when the access request from the computer is a read access request, the device controller is configured to perform the following actions as the second data conversion processing:

reading the data of the second block size including data, which is a read access target requested by the read access request, from the storage devices which are access destinations designated by the read access request, from among the storage devices;

fetching the data, which is the read access target requested by the read access request, from the data of the second block size which has been read; and transferring the fetched data as the data of the first block size to the storage controller.

3. The storage apparatus according to claim 1, wherein the storage controller is configured to manage the load of the storage controller by comparing it with a load on the device controller in the process of executing the data input/output processing on the cache memory; and when the storage controller receives the access request from the computer, the storage controller is configured to determine that the load of the storage controller exceeds the threshold on condition that the load of the storage controller is lower than the load on the device controller; and the storage controller is configured to determine that the load of the storage controller does not exceed the threshold on condition that the load of the storage controller is higher than the load on the device controller.

4. The storage apparatus according to claim 1, wherein when the access request from the computer is a write access request, the storage controller is configured to execute the first data conversion processing; and when the access request from the computer is a read access request, the storage controller is configured to execute the second data conversion processing; and wherein when the command is a command associated with the write access request, the device controller is configured to execute the first data conversion processing; and when the command is a command associated with the read access request, the device controller is configured to execute the second data conversion processing.

5. The storage apparatus according to claim 1, wherein the storage controller is configured to:

manage the logical units which are the access targets of the computer by dividing them into a plurality of normal logical units configured in storage areas of the plurality of storage devices, and a plurality of virtual logical units which are configured in virtual storage areas and to which a real area is allocated from a plurality of pools upon write access;

manage the load of the storage controller by associating it with each normal logical unit and each pool corresponding to each virtual logical unit; manages the load of the storage controller corresponding to each normal logical unit by using a ratio of a load factor of each normal logical unit to an activity ratio of a microprocessor of the storage controller; and manage the load of the storage controller associated with each pool corresponding to each virtual logical unit by using a ratio of a load factor of each pool to the activity ratio of the microprocessor of the storage controller;

wherein when any of the normal logical units is designated as the access target by the access request from the computer, the storage controller is configured to judge whether the ratio of the load factor of the designated normal logical unit to the activity ratio of the microprocessor of the storage controller exceeds the threshold or not; and wherein when any of the virtual logical units is designated as the access target by the access request from the computer, the storage controller is configured to judge whether the ratio of the load factor of the pool corresponding to the designated virtual logical unit to the activity ratio of the microprocessor of the storage controller exceeds the threshold or not.

6. The storage apparatus according to claim 1, wherein the storage controller is further configured to:

manage the logical units which are the access targets of the computer by dividing them into a plurality of normal logical units configured in storage areas of the plurality of storage devices, and a plurality of virtual logical units which are configured in virtual storage areas and to which a real area is allocated from a plurality of pools upon write access;

manage the load of the storage controller by associating it with each normal logical unit, or a RAID group to which each normal logical unit belongs, or each pool corresponding to each virtual logical unit;

manage the load of the storage controller corresponding to each normal logical unit by using a ratio of a load factor of each normal logical unit to an activity ratio of a microprocessor of the storage controller;

manage the load of the storage controller corresponding to the RAID group, to which each normal logical unit belongs, by using a ratio of a load factor of the RAID group, to which each normal logical unit belongs, to the activity ratio of the microprocessor of the storage controller; and manage the load of the storage controller associated with each pool corresponding to each virtual logical unit by using a ratio of a load factor of each pool to the activity ratio of the microprocessor of the storage controller, wherein when any of the normal logical units is designated as the access target by the access request from the computer, the storage controller is configured to judge whether the ratio of the load factor of the designated normal logical unit to the activity ratio of the microprocessor of the storage controller or the ratio of the load factor of the RAID group, to which the designated normal logical unit belongs, to the activity ratio of the microprocessor of the storage controller exceeds the threshold or not; and wherein when any of the virtual logical units is designated as the access target by the access request from the computer, the storage controller is configured to judge whether the ratio of the load factor of the pool corresponding to the designated virtual logical unit to the activity ratio of the microprocessor of the storage controller exceeds the threshold or not.

7. The storage apparatus according to claim 6, wherein the load factor of each normal logical unit is a ratio of a measured value of access frequency to each normal logical unit per a certain period of time to a total of upper limit values of the access frequency to each normal logical unit;

wherein the load factor of the RAID group to which each normal logical unit belongs is a ratio of a measured value of access frequency to the RAID group, to which each normal logical unit belongs, per a certain period of time to a total of upper limit values of the access frequency to the RAID group to which each normal logical unit belongs; and wherein the load factor of each pool is a ratio of a measured value of access frequency to each pool per a certain period of time to a total of upper limit values of the access frequency to each pool.

8. A data processing method for a storage apparatus comprising:
a storage controller comprising a processor configured to convert data which is sent to or received from a computer via a network, based on a determination whether the processor executes a first data conversion processing or not;
a plurality of storage devices, each of the storage devices comprising a storage medium and a device controller configured to convert data based on a command from the storage controller, for instructing to execute the first data conversion processing or a second data conversion processing;
the data processing method comprising:
a step executed by the storage controller of managing a load of the storage controller by associating it with one or more logical units which are access targets of the computer in a process of executing the data input/ output processing on a cache memory;
a step executed by the storage controller, when receiving an access request from the computer, of judging whether the load of the storage controller exceeds a threshold or not;
a step executed by the storage controller, when the storage controller determines that the load of the storage controller exceeds the threshold, of executing, on the cache memory, the first data conversion processing for converting data relating to the logical units, which are the access targets of the computer, from a first block size into a second block size or the second data conversion processing for converting the data from the second block size into the first block size;
a step executed by the storage controller, when the storage controller determines that the load of the storage controller does not exceed the threshold, of giving a command to the device controller of one of the plurality of storage devices to execute the first data conversion processing or the second data conversion processing; and
a step executed by the device controller of executing the first data conversion processing or the second data conversion processing based on the command from the storage controller,
wherein the storage controller managing the load of the storage controller comprises comparing it with a load on the device controller and selecting the storage controller or the device controller to execute the data conversion based on which of the storage controller or the device controller bears the lower load.

9. The storage apparatus data processing method according to claim 8, wherein when the access request from the computer is a write access request, the data processing method further comprises the following steps as the first data conversion processing:
a step executed by the storage controller of reading the data of the second block size, including old data which is a write access target requested by the write access request, from the storage devices which are access destinations designated by the write access request, from among the storage devices, to the cache memory;
a step executed by the storage controller of updating the data of the second block size, which has been read to the cache memory, with new data of the first block size including write data added to the write access request; and a step executed by the storage controller of transferring the updated data of the second block size to the storage devices which are the access destinations designated by the write access request; and
wherein when the access request from the computer is a read access request, the data processing method further comprises the following steps as the second data conversion processing:
a step executed by the storage controller of reading the data of the second block size including data, which is a read access target requested by the read access request, from the storage devices which are access destinations designated by the read access request, from among the storage devices, to the cache memory;
a step executed by the storage controller of fetching data, which is the read access target requested by the read access request, from the data of the second block size which has been read to the cache memory; and
a step executed by the storage controller of processing the fetched data as the data of the first block size; and
wherein when the access request from the computer is a write access request, the data processing method further comprises the following steps as the first data conversion processing:
a step executed by the device controller of reading the data of the second block size including old data, which is a write access target requested by the write access request, from the storage devices which are access destinations designated by the write access request, from among the storage devices;
a step executed by the device controller of updating the data of the second block size, which has been read, with new data of the first block size including write data added to the write access request; and
a step executed by the device controller of storing the updated data of the second block size in the storage devices which are the access destinations designated by the write access request; and
wherein when the access request from the computer is a read access request, the data processing method further comprises the following steps as the second data conversion processing:
a step executed by the device controller of reading the data of the second block size including data, which is a read access target requested by the read access request, from the storage devices which are access destinations designated by the read access request, from among the storage devices;
a step executed by the device controller of fetching the data, which is the read access target requested by the read access request, from the data of the second block size which has been read; and
a step executed by the device controller of transferring the fetched data as the data of the first block size to the first controller.

10. The storage apparatus data processing method according to claim 8, further comprising:
a step executed by the storage controller of managing the load of the storage controller by comparing it with a load on the device controller in the process of executing the data input/output processing on the cache memory;

a step executed by the storage controller, when receiving the access request from the computer, of determining that the load of the storage controller exceeds the threshold on condition that the load of the storage controller is lower than the load on the device controller; and a step executed by the storage controller of determining that the load of the storage controller does not exceed the threshold on condition that the load of the storage controller is higher than the load on the device controller.

11. The storage apparatus data processing method according to claim 8, further comprising:

a step executed by the storage controller of executing the first data conversion processing when the access request from the computer is a write access request; and a step executed by the storage controller of executing the second data conversion processing when the access request from the computer is a read access request; and a step executed by the device controller of executing the first data conversion processing when the command is a command associated with the write access request; and a step executed by the device controller of executing the second data conversion processing when the command is a command associated with the read access request.

12. The storage apparatus data processing method according to claim 8, further comprising:

a step executed by the storage controller of managing the logical units which are the access targets of the computer by dividing them into a plurality of normal logical units configured in storage areas of the plurality of storage devices, and a plurality of virtual logical units which are configured in virtual storage areas and to which a real area is allocated from a plurality of pools upon write access;

a step executed by the storage controller of managing the load of the storage controller by associating it with each normal logical unit and each pool corresponding to each virtual logical unit;

a step executed by the storage controller of managing the load of the storage controller corresponding to each normal logical unit by using a ratio of a load factor of each normal logical unit to an activity ratio of a microprocessor of the storage controller; and a step executed by the storage controller of managing the load of the storage controller associated with each pool corresponding to each virtual logical unit by using a ratio of a load factor of each pool to the activity ratio of the microprocessor of the storage controller;

a step executed by the storage controller, when any of the normal logical units is designated as the access target by the access request from the computer, of judging whether the ratio of the load factor of the designated normal logical unit to the activity ratio of the microprocessor of the storage controller exceeds the threshold or not; and a step executed by the storage controller, when any of the virtual logical units is designated as the access target by the access request from the computer, of judging whether the ratio of the load factor of the pool corresponding to the designated virtual logical unit to the activity ratio of the microprocessor of the storage controller exceeds the threshold or not.

13. The storage apparatus data processing method according to claim 8, further comprising:

a step executed by the storage controller of managing the logical units which are the access targets of the computer by dividing them into a plurality of normal logical units configured in storage areas of the plurality of storage devices, and a plurality of virtual logical units which are configured in virtual storage areas and to which a real area is allocated from a plurality of pools upon write access; a step executed by the storage controller of managing the load of the storage controller by associating it with each normal logical unit, or a RAID group to which each normal logical unit belongs, or each pool corresponding to each virtual logical unit;

a step executed by the storage controller of managing the load of the storage controller corresponding to each normal logical unit by using a ratio of a load factor of each normal logical unit to an activity ratio of a microprocessor of the storage controller;

a step executed by the storage controller of managing the load of the storage controller corresponding to the RAID group, to which each normal logical unit belongs, by using a ratio of a load factor of the RAID group, to which each normal logical unit belongs, to the activity ratio of the microprocessor of the storage controller;

a step executed by the storage controller of managing the load of the storage controller associated with each pool corresponding to each virtual logical unit by using a ratio of a load factor of each pool to the activity ratio of the microprocessor of the storage controller;

a step executed by the storage controller, when any of the normal logical units is designated as the access target by the access request from the computer, of judging whether the ratio of the load factor of the designated normal logical unit to the activity ratio of the microprocessor of the storage controller or the ratio of the load factor of the RAID group, to which the designated normal logical unit belongs, to the activity ratio of the microprocessor of the storage controller exceeds the threshold or not; and a step executed by the storage controller, when any of the virtual logical units is designated as the access target by the access request from the computer, of judging whether the ratio of the load factor of the pool corresponding to the designated virtual logical unit to the activity ratio of the microprocessor of the storage controller exceeds the threshold or not.

14. The storage apparatus data processing method according to claim 13, wherein the load factor of each normal logical unit is a ratio of a measured value of access frequency to each normal logical unit per a certain period of time to a total of upper limit values of the access frequency to each normal logical unit; wherein the load factor of the RAID group to which each normal logical unit belongs is a ratio of a measured value of access frequency to the RAID group, to which each normal logical unit belongs, per a certain period of time to a total of upper limit values of the access frequency to the RAID group to which each normal logical unit belongs; and wherein the load factor of each pool is a ratio of a measured value of access frequency to each pool per a certain period of time to a total of upper limit values of the access frequency to each pool.

\* \* \* \* \*